United States Patent
Marin

(10) Patent No.: US 11,720,711 B2
(45) Date of Patent: *Aug. 8, 2023

(54) SYSTEM AND METHOD FOR INTERACTION OBJECT MANAGEMENT IN A BLOCKCHAIN ENVIRONMENT

(71) Applicant: Gustavo Manuel Damil Marin, Point Roberts, WA (US)

(72) Inventor: Gustavo Manuel Damil Marin, Point Roberts, WA (US)

( * ) Notice: Subject to any disclaimer, the term of this patent is extended or adjusted under 35 U.S.C. 154(b) by 190 days.

This patent is subject to a terminal disclaimer.

(21) Appl. No.: 17/163,088

(22) Filed: Jan. 29, 2021

(65) Prior Publication Data

US 2021/0182431 A1  Jun. 17, 2021

Related U.S. Application Data

(63) Continuation of application No. 16/231,498, filed on Dec. 22, 2018, now Pat. No. 10,943,029, which is a
(Continued)

(51) Int. Cl.
*G06F 21/00* (2013.01)
*G06F 21/62* (2013.01)
(Continued)

(52) U.S. Cl.
CPC .......... *G06F 21/6272* (2013.01); *G06F 21/31* (2013.01); *G06F 21/54* (2013.01); *G06F 21/57* (2013.01); *G06F 21/602* (2013.01); *H04L 9/0637* (2013.01); *H04L 9/3236* (2013.01); *H04L 9/3247* (2013.01); *H04L 9/34* (2013.01);
(Continued)

(58) Field of Classification Search
CPC .... G06F 21/6272; G06F 21/602; G06F 21/57; G06F 21/54; H04L 9/34; H04L 9/0637; H04L 67/104
See application file for complete search history.

(56) References Cited

U.S. PATENT DOCUMENTS

| 9,075,845 B1 | 7/2015 | Thayer et al. |
| 9,351,124 B1 | 5/2016 | Shelton |
(Continued)

FOREIGN PATENT DOCUMENTS

WO  2016015041 A1  1/2016

*Primary Examiner* — Mahfuzur Rahman
(74) *Attorney, Agent, or Firm* — Gustavo Marin; Marin Patents LLC

(57) ABSTRACT

A system and method for block management of interactions comprising a network-connected block management computer connected to a plurality of connected devices and to one or more blockchains to enable an object compiler to receive a plurality of criteria from a requesting device. The compiler the receives a plurality of blocks from the blockchains based on the criteria. Each block corresponding to a preconfigured interaction object previously written by devices either during or after the completion of a transaction. The compiler analyzes the preconfigured interaction objects to determine if there is corresponding supplemental object. The compiler requests the supplemental blocks from the blockchains, and processes supplemental objects based on type, if no corresponding supplemental object it found, the associated interaction object is flagged.

12 Claims, 11 Drawing Sheets

Related U.S. Application Data continuation of application No. 15/886,649, filed on Feb. 1, 2018, now Pat. No. 10,192,073, which is a continuation of application No. PCT/US2017/062436, filed on Nov. 18, 2017.

(60) Provisional application No. 62/424,465, filed on Nov. 19, 2016.

(51) Int. Cl.
*G06F 21/31* (2013.01)
*H04L 9/32* (2006.01)
*G06F 21/54* (2013.01)
*G06F 21/57* (2013.01)
*G06F 21/60* (2013.01)
*H04L 9/06* (2006.01)
*H04L 9/34* (2006.01)
*H04L 9/00* (2022.01)
*H04L 67/104* (2022.01)

(52) U.S. Cl.
CPC .............. *H04L 9/50* (2022.05); *H04L 67/104* (2013.01); *H04L 2209/56* (2013.01)

(56) References Cited

U.S. PATENT DOCUMENTS

| | | | |
|---|---|---|---|
| 10,490,304 B2 * | 11/2019 | Shah | G06Q 50/22 |
| 2017/0091397 A1 * | 3/2017 | Shah | H04L 63/107 |
| 2017/0103167 A1 * | 4/2017 | Shah | G06F 40/40 |
| 2017/0103472 A1 * | 4/2017 | Shah | G06K 9/00597 |
| 2017/0140145 A1 * | 5/2017 | Shah | G06F 21/44 |
| 2017/0149560 A1 * | 5/2017 | Shah | H04L 9/0637 |
| 2017/0236094 A1 * | 8/2017 | Shah | G06Q 10/063 705/300 |
| 2019/0341134 A1 * | 11/2019 | Shah | H04L 63/107 |

* cited by examiner

SYSTEM AND METHOD FOR INTERACTION OBJECT MANAGEMENT IN A BLOCKCHAIN ENVIRONMENT

CROSS-REFERENCE TO RELATED APPLICATIONS

This application is a continuation of U.S. patent application Ser. No. 16/231,498 titled, "SYSTEM AND METHOD FOR INTERACTION OBJECT RECONCILIATION IN A BLOCKCHAIN ENVIRONMENT" filed on Dec. 22, 2018 which is a continuation of U.S. patent application Ser. No. 15/886,649 titled, "SYSTEM AND METHOD FOR INTERACTION OBJECT RECONCILIATION IN A BLOCKCHAIN ENVIRONMENT" filed on Feb. 1, 2018 which is a continuation of PCT application PCT/US2017/062436 titled, "SYSTEM AND METHOD FOR INTERACTION OBJECT RECONCILIATION IN A PUBLIC LEDGER BLOCKCHAIN ENVIRONMENT" filed on Nov. 18, 2017 which claims the benefit of, and priority to U.S. provisional application 62/424,465 titled, "SYSTEM AND METHOD FOR BLOCK RECONCILIATION" filed on Nov. 19, 2016, the entire specifications of which are incorporated herein by reference.

BACKGROUND OF THE INVENTION

Field of the Art

The disclosure relates to the field of information security, and more particularly to the field of securely recording, storing and reconciling interactions between a plurality of devices in a distributed blockchain environment.

Discussion of the State of the Art

In an evolving generation of devices, devices may communicate with each other in an infrastructure generally known as the Internet of Things (IoT). IoT bears similarities to communications on Internet and even shares some of the same infrastructure. That is, the conventional Internet includes wired and wireless communication paths between end-user computing devices, computing servers, network switches, repeaters, modems, access points, and the like. IoT may use the wired and wireless communication paths of the conventional Internet to pass data. Different from the conventional Internet, a portion of endpoint IoT devices often comprise machines that do not have traditional user input and output interfaces. For example, a plurality IoT device communicatively coupled to each other will often be configured without a display, a keyboard, a mouse, or any other human user input and output communication interface often associated with a conventional Internet device (for example, a personal computer, a smart phone, a tablet, a laptop computer, and the like). The IoT device may include certain annunciators, switches, sensors, rudimentary displays, wired or wireless control devices, and the like. Nevertheless, the machine will typically not have the type of human interfaces generally associated with a computing device that communicates via the conventional Internet. In some applications, an automated IoT interface to physical objects is desirable from an automation and user-less interaction perspective.

In the art of interaction reconciliation when multiple participants are involved, it is often desirable to ensure agreement and accurate recordation of interactions in a secure way that is resistant to tampering and one that reflects accuracy; maintaining protection of sensitive information associated to the interaction for a variety of purposes, such as companies protecting internal proprietary information, or customer data such as transaction data, financial data, account numbers, identification information, or any of a wide variety of potentially sensitive material that malicious third parties may desire to tamper with; and, reconciliation of interaction details for an interaction involving a plurality of participants for accuracy.

One particular sensitive area of information security, is that of interaction fulfilment and authentication. First, when multiple participants are involved and recording the same interaction (albeit from different perspectives), and while a large focus is put on protecting information in the sense of preventing unauthorized access (i.e., preventing unwanted individuals or entities from gaining access to files to steal information or for financial gain), an additional area of concern remains—regarding protecting interaction data from being tampered with or falsified or for missing information that can affect interaction outcomes, for example, when an agreement is made and not followed through. Tampering with a file, such as making minor alterations to content data or properties or falsifying entire files such as substituting a new file with similar properties in an attempt to covertly manipulate data, is a key area of information security concern. For example, when reporting expenses on an income tax return or for a corporate expense report, it is often up to an individual user to enter accurate information. A first step in getting reports that can be trusted is making sure the person entering the data is fully trained and capable of supplying reports. This is often not possible, and when humans are involved, as mistakes happen, or, in some circumstances, an individual may have a propensity to underreport income interactions or overreport expense interactions in an attempt to pay less tax or increase reimbursements.

While it is important to accurately capture interaction details. It then becomes critical to ensure that the recording of the interaction has not been tampered with or altered, and furthermore that the interaction itself has not been falsified, erased, obfuscated, or otherwise manipulated in any way. Accordingly, it may become desirable for the multiple participants involved to ensure the authenticity of an interaction and its contents, such as any numbers discussed, or funds conveyed will be recorded by the multiple participants. In some cases, for example, when renting an automobile, a participant may not require human interaction and it may be desirable for recordation of the interaction to be performed automatically.

Blockchain technology is much broader than just bitcoin. The sustained levels of robust security achieved by public cryptocurrencies have demonstrated to the world that this new wave of blockchain technologies can provide efficiencies and intangible technological benefits very similar to what the internet has done. Blockchains are a very powerful technology, capable of performing complex operations, capable of understanding much more than just how many bitcoins you have currently have in your digital wallet. The concept of smart contracts enables additional applications to be included as part of the blockchain ledger and enables a secure interaction repository. However, blockchains known in the art to primarily designed to perform a small set of simple operations—mainly, transactions of a currency-like token, where operations are mutually exclusive, the instant invention is able to extend the capability to have fulfilment of agreements in order to capture interactions that have outcomes efficiently, while still enjoying the security of a blockchain system. Because these programs are run on a blockchain, they have unique characteristics compared to other types of programming instructions.

What is needed is a means to automatically accurately capture, certify and verify any interaction from multiple devices with little or no user interaction and to ensure its authenticity, as well as a system to protect the recording of such interactions (and associated details) against any tampering, unauthorized access or duplication, so that a record exists not only of details of the interaction, but the exact times at which it was created, altered, or any other relevant operation was performed. Furthermore, any such security measures must be effective in securing a file against any potentially interested party, including those that might be responsible for the security of the file itself. Further a system to capture interactions with fulfilment results in this secure environment and reconciliation is needed.

SUMMARY OF THE INVENTION

Accordingly, the inventor has conceived and reduced to practice, in a preferred embodiment of the invention, a system and method to provide automatic entity information and device intercommunication to provide secure data communications between devices. A set of objects, rules, and guidelines permit the plurality of devices to initiate and carry out communications with another device when the services associated to one device are used by another. Given that the interactions may hold importance in conducting commercial transactions, according to a preferred embodiment of the invention, interactions between devices are stored on a blockchain that instead of involving manual processing that may take days, weeks, or months to complete, huge volumes of transactions are validated automatically. Blockchain technology efficiently provides a secure mathematical validation of interactions between devices. Once the interaction is validated, one or more, distributed ledgers provide unified, tamperproof visibility into the interaction record—that is, an immutable version of interaction truth.

Accordingly, A system and method for block reconciliation of interactions comprise a network-connected block reconciliation computer comprising a memory and a processor and further comprising programmable instructions stored in the memory and operating on the processor, the programmable instructions adapted to reconcile blocks in a blockchain environment whereby a plurality of connections to a plurality of connected devices and a connection to one or more blockchains enable an object compiler to receive a plurality of criteria from a requesting device. The compiler then receives a plurality of blocks from the blockchains based on the criteria. Each block corresponding to a preconfigured interaction object previously written by the devices either during or after the completion of a transaction. In a preferred embodiment, the compiler analyzes the preconfigured interaction objects to determine if there is an associated required supplemental object to verify that a contract or fulfilment has occurred. In this regard, the compiler requests the supplemental blocks from the one or more blockchains, each supplemental block corresponding to a required supplemental object then for each requested supplemental object, if the supplemental object type is replacement, replace properties from the supplemental object into the associated interaction object with information, or, if the supplement object type is addendum, add properties from the supplemental object to the associated interaction object of the preconfigured interaction objects, or if no requested supplemental object it found, flag the associated interaction object of the preconfigured interaction objects.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

DETAILED DESCRIPTION

Figure 1:
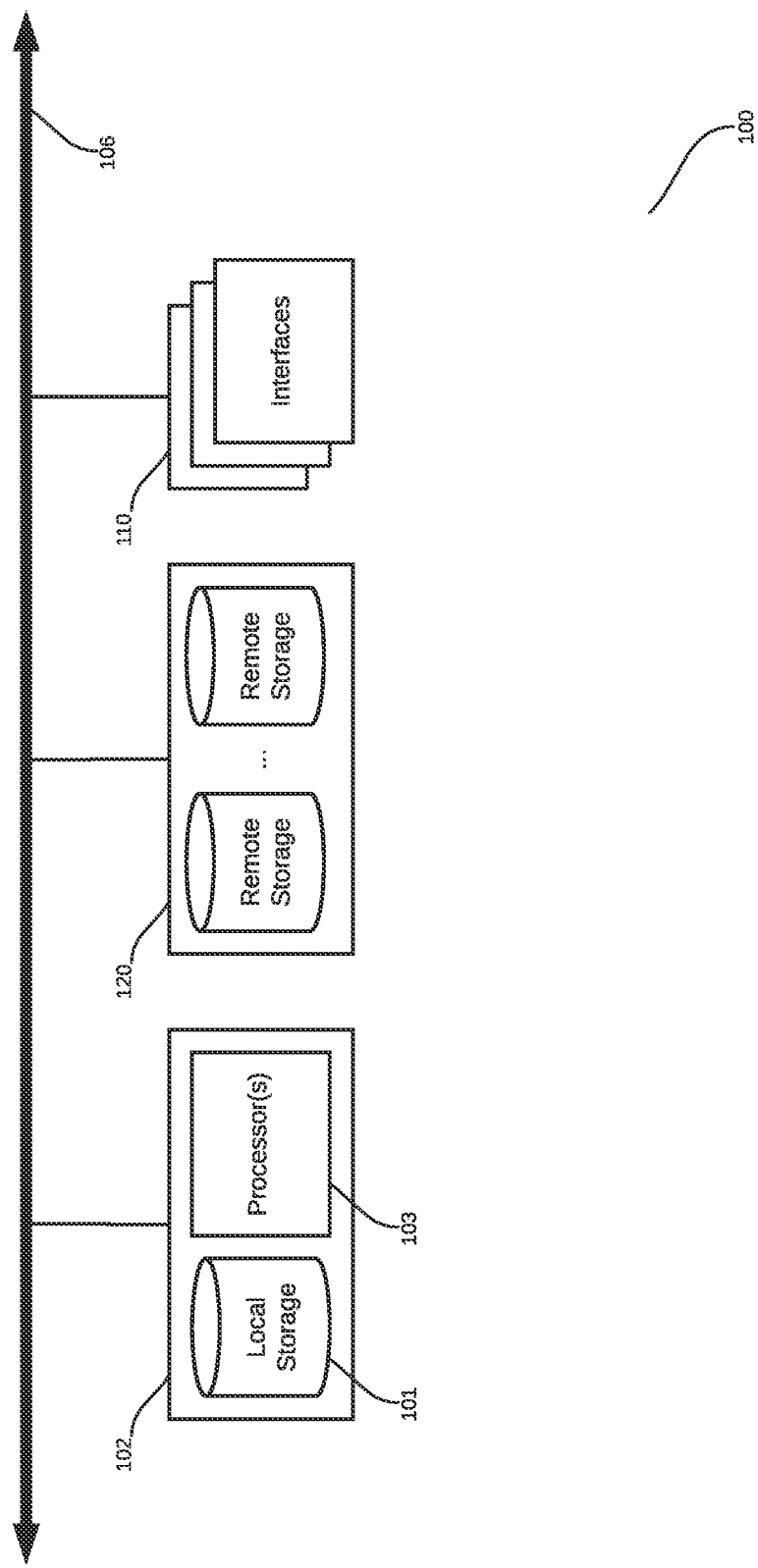
FIG. 1 is a block diagram illustrating an exemplary hardware architecture of a computing device used in an embodiment of the invention.

The inventor has conceived, and reduced to practice, a system and method for block reconciliation in a multi-party blockchain environment.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
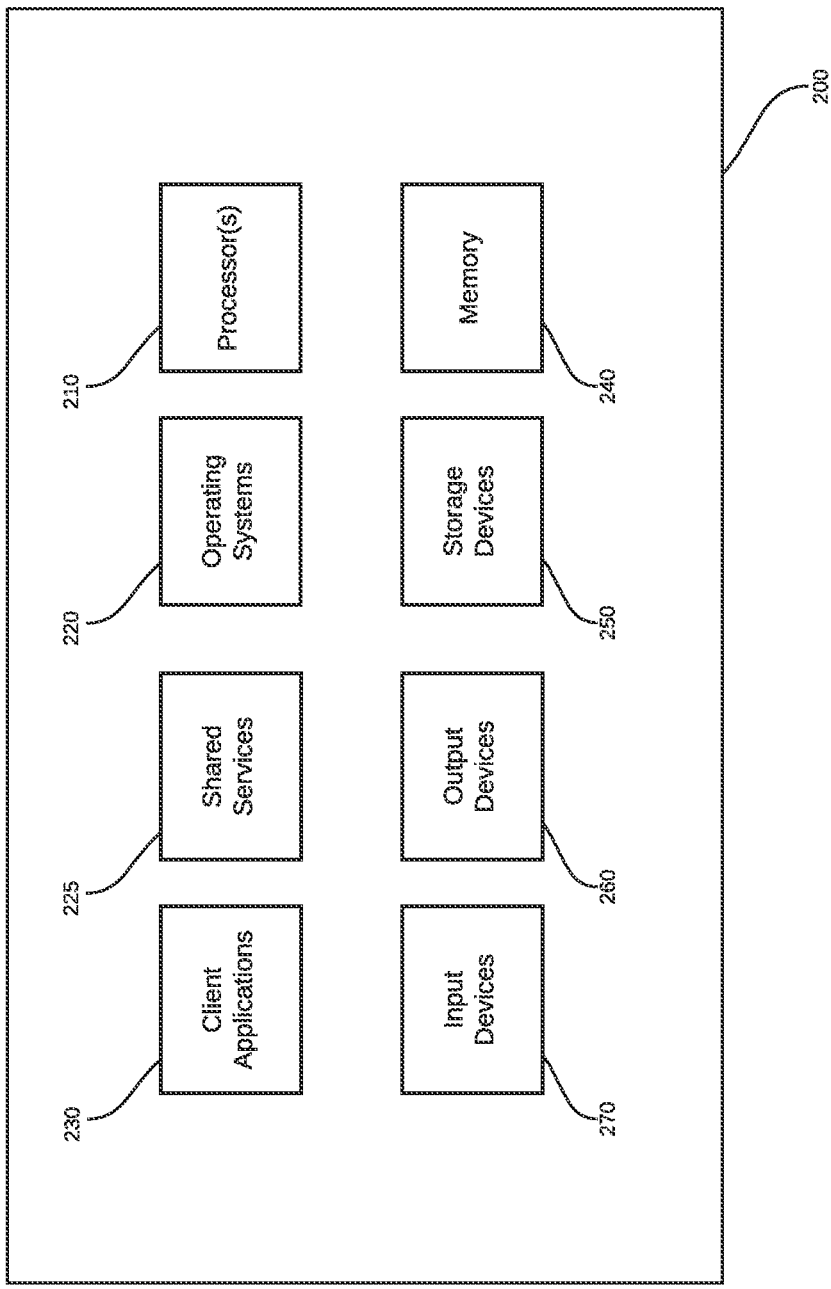
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
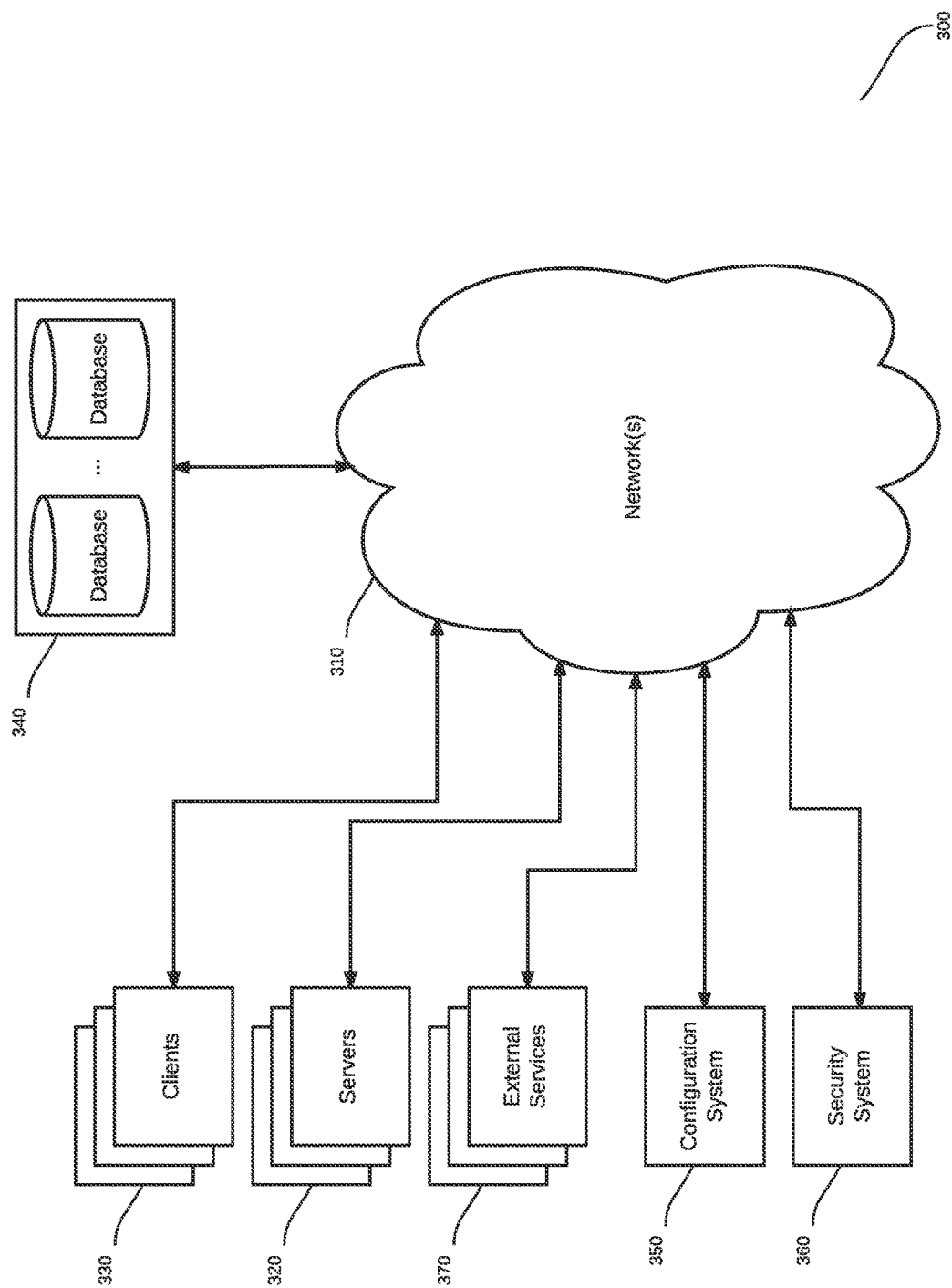
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
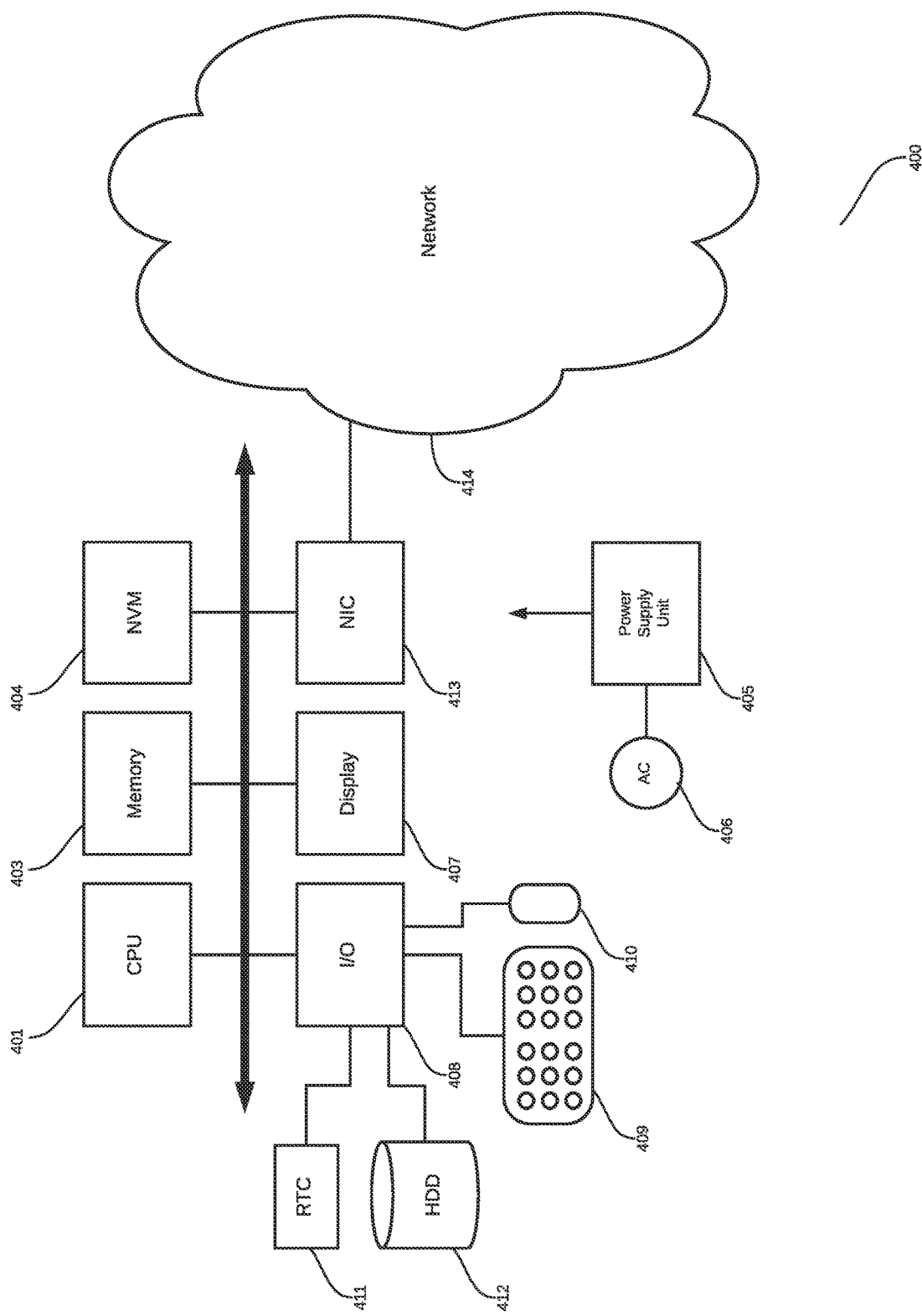
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Figure 5:
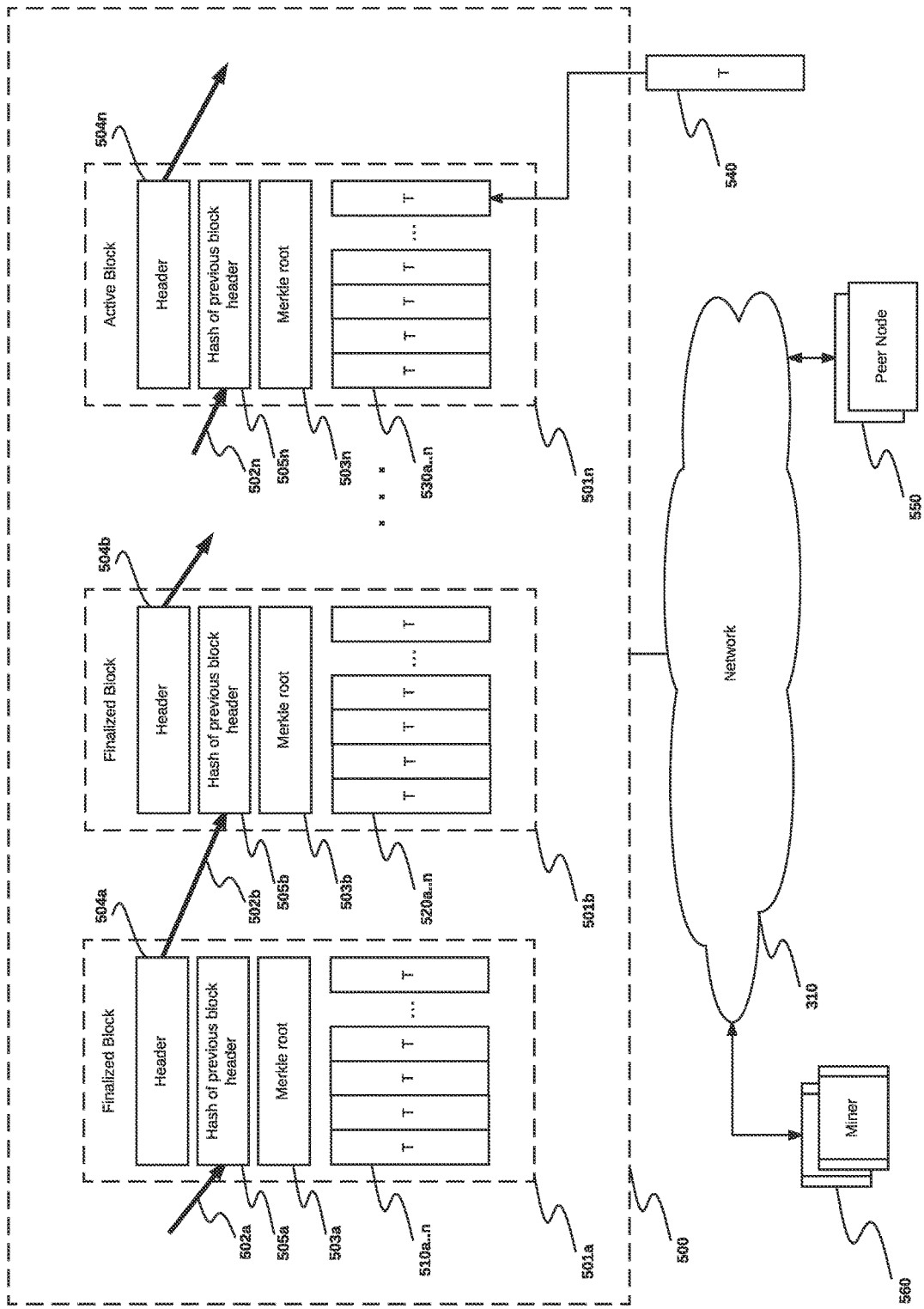
FIG. 5 is a block diagram illustrating a blockchain system, according to a preferred embodiment of the invention.

FIG. 5 is block diagram illustrating an exemplary blockchain, according to a preferred embodiment of the invention. According to the embodiment, blockchain 500 comprises a plurality of blocks 501*a* . . . *n* configured in a form of a distributed database that maintains a continuously growing list of data records (or blocks) that are hardened against tampering and revision, including the operators of peer nodes 550. The most widely known application of a blockchain is the public ledger of transactions for the Bitcoin network, although the concept of blockchains can be implemented for any kind of decentralized record keeping system, as demonstrated by the use of blockchain in other alternate cryptocurrency networks such as Namecoin, Ethereum, NXT, and the like. Most of the well-known implementation of blockchain are as a public ledger of transactions, such that all the interactions recorded on the blockchain is open to scrutiny and examination by anyone. Although it is possible to have other modified implementation of the blockchain including ones where the interactions recorded on the blockchain (or the properties of the interactions) are kept private.

Accordingly, in a blockchain, "blocks" or sets of completed transactions 510*a* . . . *n* and 520*a* . . . *n* (such as transferring cryptocurrency funds from one account to another, as with bitcoin) are periodically updated. During an update, a block is pushed from one node (generally, an originating node where a transaction completed, for example a user device used to receive or send funds) to other nodes rapidly, enabling every node in the system to maintain an up-to-date record of all transactions. Using distributed nodes, data integrity is maintained through general consensus, protecting the blockchain against tampering or errors such as might arise if nodes lose connectivity or are run autonomously and produce errors during unattended operation. The general consensus method may also enable any one node to verify a transaction with other copies of the blockchain, preventing counterfeiting or tampering.

Using a blockchain arrangement 500, signatures for recordings may be published to a blockchain either using a blockchain specifically configured for such use (for example, where each "transaction" is a single recording's unique signature), or by "piggybacking" on an existing blockchain by conducting zero-sum transactions and attaching signature data to them (for example, by using a signature as a destination wallet for a fund transfer, so it is irrevocably stored in the blockchain). In this regard, signatures may be published in a manner that is publicly accessible, easily verified and validated, and resistant to tampering or forgery.

In an exemplary implementation, blockchain 500 may contains unique identifiers which allow user devices to send and receive various tokens between various participants *that is, devices) on the network. An exact implementation of the address mechanism might change between the different implementations of blockchain 500. For example, In the bitcoin embodiment of a blockchain, addresses are created and managed using, for example, a SHA-256 based public key/private key mechanism. The following is an example bitcoin address:

1JArS6jzE3AJ9sZ3aFij1BmTcpFGgN86hA

The bitcoin address allows a plurality of user devices to send and receive tokens from a plurality of other user devices on a bitcoin network. Each time any of these tokens are sent from one bitcoin address to another, transaction 540 gets created on blockchain 500. Transaction 540 then gets validated by the network of peer nodes 550, to see if it is authentic. If confirmed to be authentic, then transaction 540 gets permanently recorded on blockchain 500, as part of the latest block 501*n*. In this regard, every Bitcoin address has a matching private key, where the bitcoin address itself acts as the public key. The private key is mathematically related to an associated bitcoin address and is designed so that the bitcoin address can be calculated from the private key, but importantly, the same cannot be done in reverse. A transaction of tokens out of a bitcoin address can only be initiated by the owner of the private key.

Note that a bitcoin address may also be created and operated by programmable instructions on a computer often referred to as smart contracts or smart contract code. These smart contracts can control and operate their bitcoin addresses, in an autonomous manner based on certain conditions as defined by their programming logic. These smart contracts may be used to automate transaction logic that may need to happen on the blockchain.

Although bitcoin is the primary token that gets transferred between users on the bitcoin network, the bitcoin blockchain can be used to issue and transact in several other custom created tokens. These tokens may be collectively referred to as "interaction objects" (as is described later). The creation of interaction objects on the bitcoin blockchain can be enabled using an overlay network protocols (e.g. Counterparty, Mastercoin, Colored coins, etc.) or using several other alternate techniques including but not limited to side chain implementations.

The bitcoin blockchain has been used in a number of instances to explain principles and concepts throughout this document, as it is an exemplary embodiment of a blockchain. The use of blockchain and other related concepts are in no way limited to the bitcoin blockchain. Any number of other related or different implementations of blockchain may be used by a valid embodiment of the present invention, including other alternate implementations of the blockchain such as NXT, Ethereum or other private blockchains.

A hash function or a hash algorithm may be any function that can be used to map one or more data inputs of arbitrary size into fixed or varying length data, such that the mapped data acts as a unique identifier for the input data. The values returned by a hash function can be referred to as hash values, hash codes, hash sums, unique hash identifiers or simply hashes. Some of the more common hashing functions that rely on cryptography include SHA1, SHA2, SHA256 and MD5. But hashing function can use several other techniques including non-cryptographic technologies, such as simple merging of all the data inputs, or passing along the input data unaltered provided the input data is already unique.

Encryption is a process of coding information which could either be a file or mail message in into cipher text a form unreadable without a decoding key in order to prevent anyone except the intended recipient from reading the encrypted data. Decryption is the reverse process of converting encoded data to its original un-encoded form, for example, plaintext.

A key in cryptography is a long sequence of bits used by encryption/decryption algorithms. For example, the following represents a hypothetical 40-bit key:

00001010 01101001 10011110 00011100 01010101

An encryption algorithm may take an original message, and a key (for example, a private key), and alters the original message mathematically based on the key's bits to create a new encrypted message. Likewise, a decryption algorithm takes an encrypted message and restores it to its original form using one or more keys. When a user device encodes a piece of information, another user cannot decode and read that piece of information without the decryption key (for example, a public key). Through this mechanism one can add a digital signature to digital content/information, such that it acts as a form of personal authentication, ensuring the integrity of the original message. To encode plaintext, an encryption key is used to impose an encryption algorithm onto the data. To decode cipher, a user must possess the appropriate decryption key. A decryption key consists of a random string of numbers, for example, from 40 through 2,000 bits in length. The key imposes a decryption algorithm onto the data. This decryption algorithm reverses the encryption algorithm, returning the data to, for example, plaintext. The longer the encryption key is, the more difficult it is to decode. For a 40-bit encryption key, over one trillion possible decryption keys exist.

There are two primary approaches to encryption: symmetric and public-key (or asymmetric). Symmetric encryption is the most common type of encryption and uses the same key for encoding and decoding data. This key is known as a session key. Public-key (or asymmetric) encryption uses two different keys, a public key and a private key. One key encodes the message and the other decodes it. The public key is widely distributed while the private key is secret. Some examples of popular symmetric key algorithms are, AES, 3DES modes along with the original DES algorithm and its block cipher modes. Some examples of public-key (or asymmetric) encryption algorithms include, DSS, RSA, ECDSA.

Aside from key length and encryption approach, other factors and variables impact the success of a cryptographic system. For example, different cipher modes, in coordination with initialization vectors and salt values, can be used to modify the encryption method. Cipher modes define the method in which data is encrypted. The stream cipher mode encodes data one bit at a time. The block cipher mode encodes data one block at a time. Block encryption may be used to implement a digital signature mechanism used to prove authenticity in various scenarios.

Blockchain 500 may comprises of a series of a plurality of grouped together transactions (or blocks) 501$a$ . . . $n$, that may be linked to one another in a time linear manner 502$a$ . . . $n$. One or more new transactions 510$a$ . . . $n$, 520$a$ . . . $n$, 530$a$ . . . $n$ may be collected into the transaction data part 510$a$ . . . $n$, 520$a$ . . . $n$, and 530$a$ . . . $n$ of each respective block 501$a$ . . . $n$. In some embodiments, copies of each transaction may be hashed, and the hashes could then be paired, hashed, paired again, and hashed again until a single hash remains, which could act as the merkle root 503$a$ of a merkle tree 503$a$ . . . $n$. A merkle root 503$a$ . . . $n$ may be stored in block header 504$a$ . . . $n$. Each block could also store the hash 505$a$ . . . $n$ of the previous block's header, chaining the blocks together. Accordingly, a transaction cannot be modified without modifying the block that records it and all following blocks. Chaining blocks together in this fashion makes it impossible to modify transactions included in any block without modifying all following blocks. Thus, the cost to modify a block increases with every new block added to the blockchain. This system provides a robust way to prevent the tampering of the transactions on blockchain 500. Blockchain 500 may be collaboratively maintained by anonymous peer nodes 550 on the network, as parts of the blockchain network or, in other embodiments, peer nodes 550 may not be anonymous. The blockchain might be part of a global network via network 310, as in the case with bitcoin. In other embodiments, network 310 may be a local network.

Miners 560 provide a process for adding transaction records to a ledger of transactions (that is, blockchain 500) as blocks. Blockchain 500 can be seen as chain of blocks 510$a$ . . . $n$, 520$a$ . . . $n$, 530$a$ . . . $n$, etc. Blockchain 500 serves to confirm transactions, for example, transaction 540) to the rest of the network as having taken place. Nodes use blockchain 500 to distinguish legitimate transactions from attempts to manipulate transactions that have already taken place. Miners 560 are resource-intensive and difficult so that the number of blocks found each day by miners 560 remains steady. Individual blocks must contain a proof of work to be considered valid. This proof of work is verified by other blockchain 500 nodes (for example, peer nodes 550) each time they receive a block. For example, in a Bitcoin arrangement, a hashcash proof-of-work function is used. In a preferred embodiment, miners 560 allow nodes to reach a secure, tamper-resistant consensus. Miners 560 may also be a mechanism used to introduce blocks into the system (in some embodiments, in conjunction with other components). In some embodiment, miners 560 are compensated with transaction fees as well as a "subsidy" of newly created nodes. This both serves the purpose of disseminating new nodes in a decentralized manner as well as motivating connected devices to provide security for the system.

Conceptual Architecture

Figure 6:
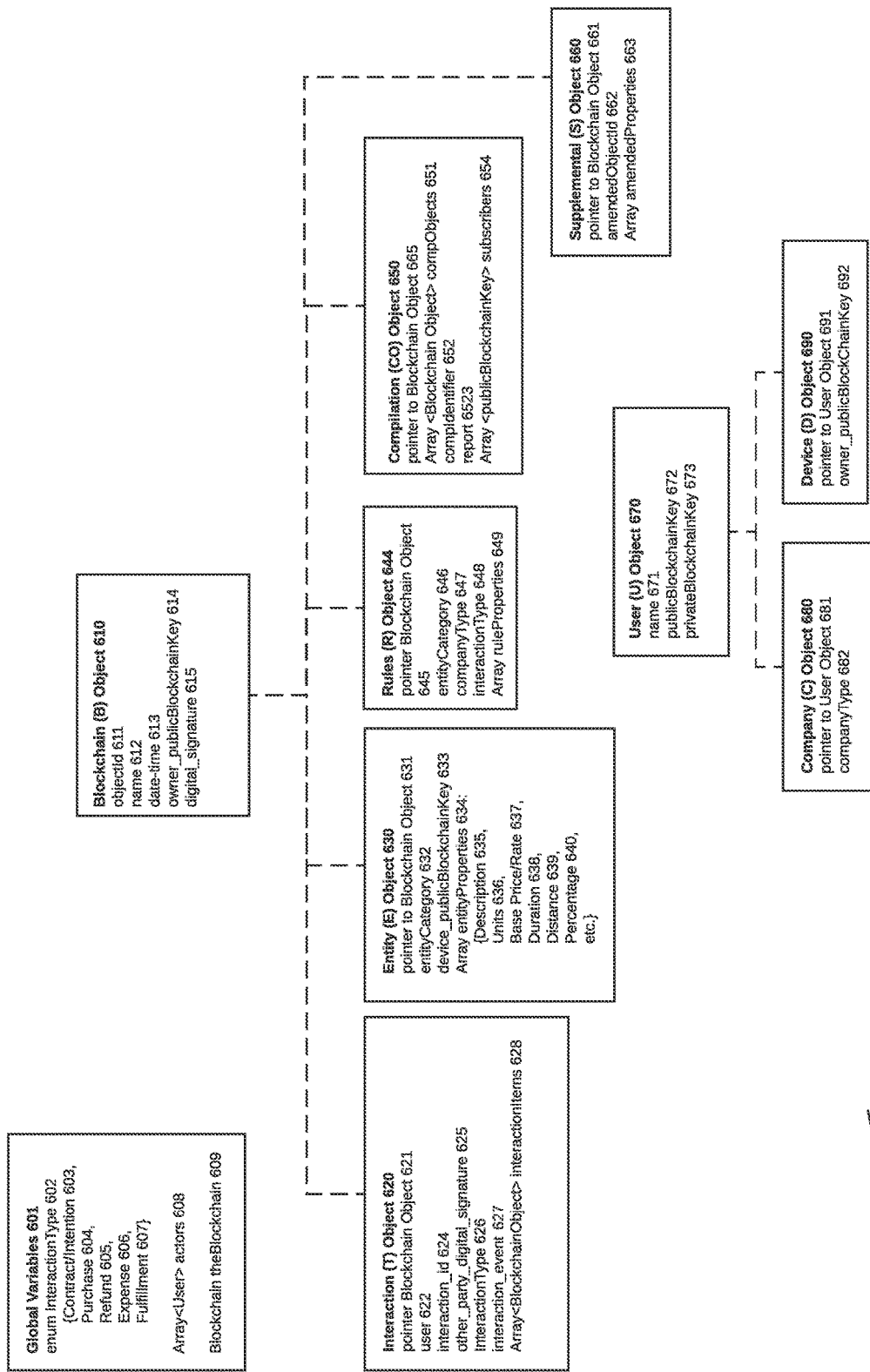
FIG. 6 is a block diagram illustrating a plurality of exemplary objects for a block reconciliation system, according to a preferred embodiment of the invention.

FIG. 6 is a block diagram illustrating a plurality of exemplary objects for a block reconciliation system, according to a preferred embodiment of the invention. According to the embodiment a plurality of data objects 600 are used for a block reconciliation system comprising a plurality of objects 600 associated to a plurality of actors in the system whereby an actor may be a user device, an administrator device, an entity device. According to them embodiment a plurality of global variables 601 define a plurality of global states for the system environment 700 (as in FIG. 7). Global variables 601 comprise an enumerated InteractionType 602 which may define a list of interaction types available to system 700 to describe what type of interaction is referenced for various interactions of the system. In an exemplary embodiment, InteractionType 602 may comprise, at least: contract/intention 603 which may define a contract or, for example, a memorandum-of-understanding for an interaction. In a preferred embodiment, contract/intention 603 may correspond to a smart contract that programmatically, via programming instructions, facilitates, verifies, or enforces the negotiation or performance of contract/intention 603. In this regard, a contractual clause in, for example, an associated document, may expect a fulfillment interaction (for example, InteractionType 602 being fulfilment 607) to finalize it or indicate that the contract had a predicted outcome. InteractionType 602 may further comprise purchase 604 may define an interaction the represents an exchange of value of some sort between, for example, one or more user, provider, or subscriber devices, or with some other connected device. In some embodiments, a purchase may require a fulfilment to indicate that goods were delivered for the purchase. InteractionType 602 may further comprise refund 605 may define an interaction that represents a restoration of exchanged value where an exchange of value may have happened previously between, for example, one or more user, provider, or subscriber devices, or with some other connected device. InteractionType 602 may further comprise expense 606 that may define an interaction type that is an expense category, for example, if an interaction was a reimbursable amount by, for example, a juristic entity associated to a user device 713 associated to the interaction that may, for example, have an agreement in place for reimbursement of any value exchanged. InteractionType 602 may further comprise fulfilment 607 may be an interaction type that defines a fulfilment of a previous interaction type, for example, if a previous InteractionType 602 was a contract 603 (as described earlier), the fulfilment 607 interaction type, may indicate that the contract or agreement was fulfilled. Global Variables 601 may further comprise an array of actors 608 that may define one or more user devices associated to the interaction; global variables 601 may further comprise a pointer to theBlockchain 609 whereby the pointer defines a location to a blockchain (for example, blockchain 500 as in FIG. 5) for recordation of interactions, configurations, and other data of system 700. It should be appreciated that system 700 may use one or more blockchains 500 (referring to FIG. 5) or other distributed public (or private) ledger database schemas that may maintain a continuously-growing list of ordered records (for example, as described in FIG. 5) for interactions, configurations, and other data of system 700. It should be appreciated by one with ordinary skill in the art that the interaction types may be different or may describe other global states for system 700. It should also be appreciated that there may be other global variables 601 associated defining additional or different global states for system 700 and that this is simply an exemplary subset.

In a preferred embodiment, blockchain object 610 may define basic information associated to a transaction that is to be recorded to blockchain 500 configured in the global variable theBlockchain 609. According to the embodiment, blockchain object 610 may comprise objectId 611 that may be a unique identifier identifying the instance of blockchain object 610. Blockchain object 610 may further comprises name 612 which may comprise a textual name (for example, an ASCII description) for the instance of blockchain object 610. Blockchain object 610 may further comprise date-time 613 to record a date and time associated to the instance of blockchain object 610. Blockchain object 610 may further comprise owner_publicBlockchainKey 614 that may define an actor (for example, a device 712 to 715) associated to the instance of blockchain object 610. In some embodiments, owner_publicBlockchainKey 614 may be associated to a user object 670. Blockchain object 610 may further comprise digital_signature 615 defining a sequence of characters that may be used by one of a plurality of miners 560 (as in FIG. 5) to verify that the true owner associated to owner_publicBlockchainKey 614 of the given publicBlockChainKey 672 of the instance of blockchain object 610, is genuine.

In a preferred embodiment, interaction object 620 comprises properties an information associated to interactions between devices 712 to 715 within system 700. Interaction object 620 may comprise a pointer to a blockchain object 621 which may be a pointer to one or more theBlockChain 609 (that is, the instant interaction object 620 effectively inheriting the properties and fields of a blockchain object 610) which may represent blockchain 500 to which the instant interaction objects 620 may be used for recording interactions or reading prerecorded information. Interaction object 620 may further comprise user 622 which may correspond to a user object 670, a company object 680, or a device object 690 that may be involved with an interaction to which the instant interaction object 620 is associated. Interaction object 620 may further comprise interaction_id 624 which may be a unique id associated to the interaction. Interaction object 620 may further comprise other_party_digital_signature 625 which may be a digital signature associated to a digital signature to other parties (for example, another user object 670, company object 680, or device object 690) that may be associated to the instant interaction object 620. In some embodiments, the validity of the other parties is determined (for example, by miners 560 or in some embodiments, by peer nodes 550) based on other_party_digital_signature 625 and an associated publicBlockchainKey 672. It should be appreciated that other_party_digital_signature 625 may be how the system may know that the "other party" was actually involved in the interaction. Interaction object 620 may further comprise InteractionType 626 which may indicate an interaction type for the instant interaction object 620. Interaction object 620 may further comprise interaction_event 627 which may be an optional parameter that may be used to categorize the instant interaction object 620 with a certain keyword (for example, "business trip", "conference 2015", or the like). Interaction object 620 may further comprise Array<BlockchainObject> interactionItems 628 which may be an array of associated interactions items associated to the instant interaction object 620.

In a preferred embodiment, entity object 630 is associated to an entity device 715 describing properties and functions available to system 700. In a preferred embodiment, an entity is a physical object that may serve a purpose, for example, a vehicle may be an entity whereby an entity device 715 may be attached thereon and provides information about the physical object such as who may have used the vehicle, how far and locations of the vehicle during a particular timeframe (or other parameter). In this regard, an entity device 715 would be attached (physically or logically) to the physical object to "connect" the services and capabilities to network 310. In this example, if there was value exchanged between devices 712 to 715 for the use of the vehicle, and the like, then an interaction would occur and be recorded. An entity device 715 can be associated to any physical object whereby the associated entity device 715 captures data on that device for use in system 700. Entity object 630 may comprise a pointer to blockchain object 631 inheriting all fields and properties of blockchain object 610 (as is known in the art of object-oriented programming). Entity object 630 may further comprise entityCategory 632 which defines what type of entity is associated to the instant entity object 630. For example, a vehicle, a meeting room, a desk, or some other item to which a device (that is, a device described by device object 690) is associated to in system 700, whereby the device defines properties, actions, and other functions that may be performed, such as renting, using, driving, etc. Entity Object 630 may further comprise device_publicBlockchainKey 633 which corresponds to a publicBlockchainKey 672 (as inherited) by an associated device object 690. Entity Object 630 may further comprise Array entityProperties 634 which may comprise a plurality of properties describing characteristics of the corresponding entity. EntityProperties 634 may comprise description 635, a description of the entity; units 636, a number of units associated to the entity (if any); base price/rate 637, if the entity has an associated cost component (for example a rate for a car rental); duration 638, a numeric value associated to the amount of time an entity is available for use or a duration of how long it may have been used; distance 639, corresponding to a distance the entity traversed while used (for example, the usage of a vehicle); percentage 640 which may be a percentage amount that may be used for different purposes, such as the use of the entity is only considered at a percentage; and the like. It should be appreciated that these properties are merely exemplary and different properties could describe usage of services associated to entity devices 715 (or in some embodiments, user devices 713).

In a preferred embodiment, rules object 644 comprises a set of rules associated to an interaction or an entity, or both, and may dictate how objects are compiled or recorded. According to the embodiment, rules object 644 may comprise a pointer blockchain object 645 which may be a pointer to a blockchain similar to previous objects. It should be appreciated that a plurality of rules can be created and associated to other objects 600 to define a behavior for the associated objects during issuance, compilation, or reporting. In some embodiments, a plurality of rule sets may be configured such that different instances of system 700 (or different objects sets 600 of system 700) may use a different set of rules based on preconfigured states to have objects behave in a particular way based on a preconfigured set of rules. For example, rules may be based on jurisdiction, location, time-of-year, or some other identifier. Rules object 644 may further comprise entityCategory 646 which may define a category for an entity, for example, items needed for business transactions, items needed for lodging or travel. Rules object 644 may further comprise companyType 647 which may identify a type of company associated to the rule object 644. Rules object 644 may further comprise interactionType 648 which identifies which interaction type is associated to the instance of the rule object 644. Rules object 644 may further comprise ruleProperties 649 which may be an array to optional properties associated to the instant instance of the rule object 644. For example, rule properties may define specific aspects to the rule outlined in the instant instance of rule object 644, including, but not limited to, how the rule manipulates values associated to an interaction object (for example, the value is divided into subcomponents whereby each subcomponent is treated differently, whether an associated value is subject to other rules, what sort of category should be associated to the entity, etc.)

In a preferred embodiment, compilation object 650 associates a plurality of objects 600, the plurality of objects 600 identified by an array of compObjects 651 that are deemed to be associated to each other by compilation identifier compIdentifier 652 for calculation and reporting purposes. It should be appreciated that compIdentifier 652 may be compiled by compiler 701 in a number of ways that includes, but not limited to: objects 600 associated to a particular user object 670, company object 680, device object 690; associated to a specific time period, or some other common element within system 700. According to the embodiment, compilation object 650 may comprises a pointer to blockchain object 665 to inherit properties, as described earlier. Further according to the embodiment, compilation object 650 may comprise report 652 which may be an identifier associated to a report by report engine 716. According to the embodiment, compilation object 650 may further comprise subscribers 653 which may be an array identifying one or more user objects 670 or company objects 680 associated to subscriber devices 714 that have access report 652.

In a preferred embodiment, supplemental object 660 may comprise an object supplying supplement information associated to a previous object 600 (for example, a previous interaction object 620) whereby the supplemental information provides additional information including, but not limited to, a fulfilment of fulfilment 607 identified in a previous associated object. Supplemental object 660 may also identify and amend or added information for a previous object 600 whereby amended properties are updated or other properties added. According the embodiment, supplemental object 660 may comprise pointer to blockchain object 661, inheriting all properties, as described earlier. Further according the embodiment, supplemental object 660 may comprise amendedObjectId 662 which may identify the previously associated object, that is the object that is being fulfilled or amended. Further, according the embodiment, supplemental object 660 may comprise array amendedProperties 663 which may be an array of properties with associated fulfilment information or identifying a number of properties that are identified as amended.

In a preferred embodiment, user object 670 describes a user device 713 registered within system 700. According to the embodiment, user object 670 may comprise name 671 which may identify a name or label describing the associated user device 713. Further, according to the embodiment, user object 670 may comprise publicBlockchainKey 672 which may be a public key associated to a cryptographic system that uses pairs of keys: public keys which may be disseminated widely, and private keys which are known only to the user device 713. Further, according to the embodiment, user object 670 may comprise privateBlockchainKey 673 which may be a private key associated to the cryptographic system that uses pairs of keys: public keys which may be disseminated widely, and private keys which are known only to the user device 713.

In a preferred embodiment, company object 680 may be a type of user device associated to a juristic entity or associated to some service provider. In some embodiments, company object 680 may be associated to one or more user objects 670. In this regard, company object 680 may perform reporting, via report engine 716, and the one or more user objects 670. Accordingly, company object 680 may comprise pointer to user object 681 which may be a pointer to user object 670 inheriting all properties, as described earlier. According to the embodiments, company object 680 may further comprise companyType 682 which may identify a company type, for example, a company that provides particular services such as a car rental agency, an office rental company, a restaurant, an entertainment facility, and the like. It should be appreciated that in some embodiments, a company object 680 is associated to a plurality of device objects 690, each associated to a company device 712 identifying a device that is associated to a plurality of user devices 713 (as described by a plurality of user objects 670) whereby interaction information associated to the plurality of user devices 713 are accessible by company device 712. In other embodiments company object 680 is associated to one or more entity device 715 whereby an entity device provides details on services provided by the company object 680.

In a preferred embodiment, device object 690 describes an entity device 715. According to the embodiment, device object 690 may comprise a pointer to User Object 691 inheriting all properties of user object 670, as described for other objects previously. Further according to the embodiment, device object 690 may comprise owner_publicBlockChainKey 692 which may be a public key associated to a cryptographic system that uses pairs of keys: public keys which may be disseminated widely, and private keys which are known only to the user device 715.

Figure 7:
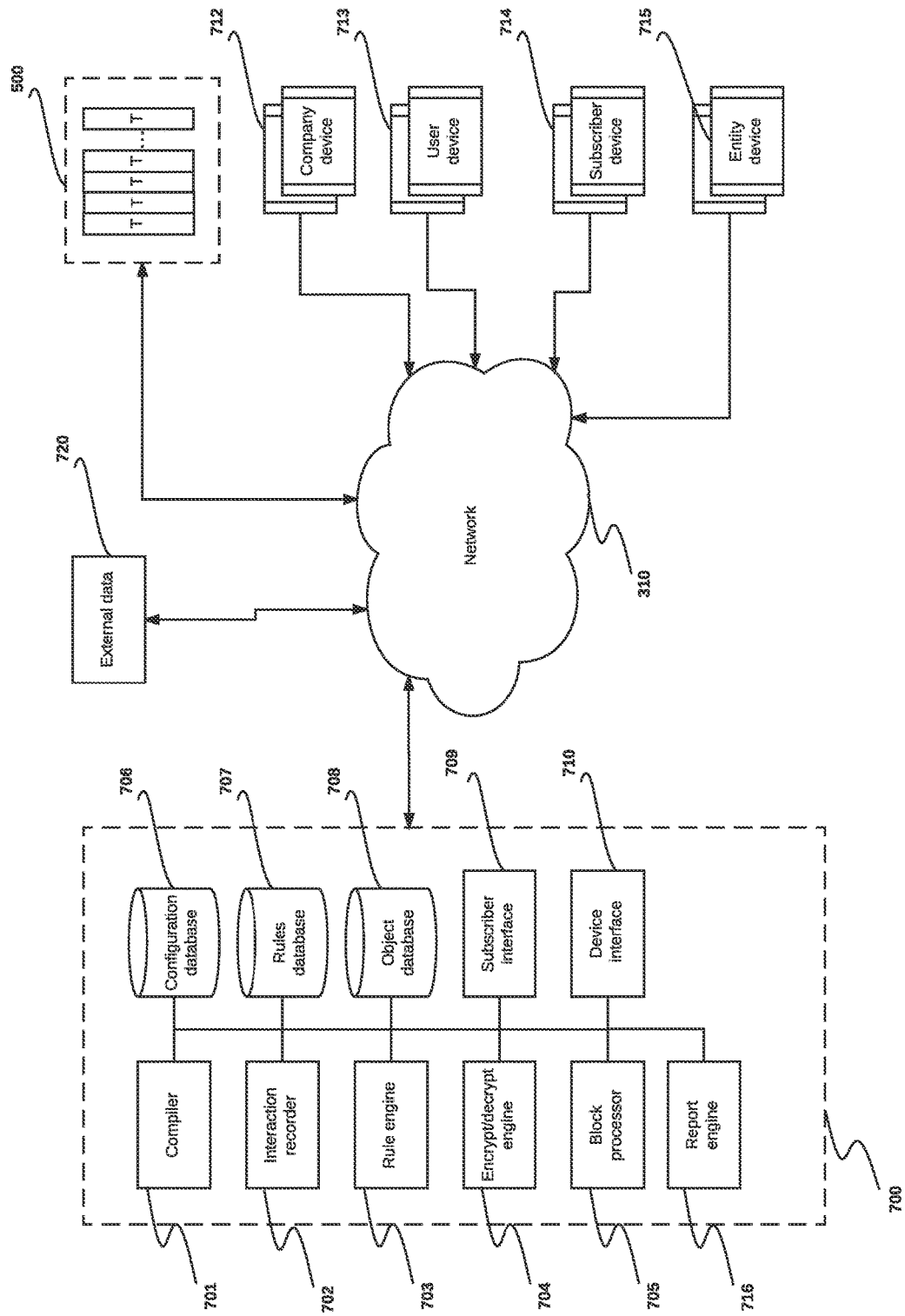
FIG. 7 is a block diagram illustrating a block reconciliation system, according to a preferred embodiment of the invention.

FIG. 7 is a block diagram illustrating a block reconciliation system, according to a preferred embodiment of the invention. According to the embodiment, a compiler 701 comprises programming instructions stored in a memory and running on a processor, the instructions configured to compiling a plurality of block objects 600 stored on blockchain 500 (that is, a plurality of objects 600 that may have been previously written as blocks by interaction recorder 702) based on specific criteria by, for example, a request form a user device 713, a company device 712, or a subscriber device 714, or any combination thereof. In some embodiments, criteria may be received from external data source 720. Compiler 701 may compile objects 600 within a period-of-time, based on objects 600 associated to a specific user object 670, based on objects 600 associated to a specific company object 680, or based on objects 600 associated to a specific device object 690, or some other identifying criteria. It should be appreciated that objects may be stored as blocks on blockchain 500. Compiler 701 may also form a compilation object 650 from a collection of objects 600 to create a compiled set of objects 600 available for use by, at least, subscriber device 714, company device 712, or user device 713, or any combination thereof. In some embodiments, compiled objects (that is, compilations objects 650) are stored on blockchain 500 and made available through an API.

Further according to a preferred embodiment, interaction recorder 702 comprises programming instructions stored in a memory and running on a processor, the instructions configured to recording a plurality of interaction objects 620 (and in some embodiments, other objects 600) for interactions between a plurality of user devices 713, company devices 712, entity devices 715, or between any combination thereof. Interactions may be usage of services represented by, for example, entity device 715, an agreement between a plurality of user devices 713, or some other transaction between devices. Entity device 715 may be a hardware computing device associated with network 310 and may be typically assigned an Internet Protocol (IP) address. The IP address is sufficient to uniquely identify entity device 715 within network 310 (for example, the Internet). In a preferred embodiment, entity devices 715 may bi-directionally communicate in a one-to-one relationship with another device 715 (or another device 712, 713, 714) coupled to network 310. Accordingly, network 310 has a plurality of devices coupled to, for example, the Internet, and other connected devices 712, 713, 714, and 715 may communicate together. In some embodiments, entity devices 715 are configured with a transceiver and other hardware and software to enable network communications both wired and wirelessly. In a preferred embodiment, entity devices 715 may provide commercial functions, consumer functions, or other functions. These devices may include vending machines, packaging equipment, utility meters, parking meters, factory automation, restaurants, meeting room facilities, car rentals, hotels, remote antenna monitoring equipment, automotive vehicles, trains, and more.

Further according to a preferred embodiment, rules engine 703 comprises programming instructions stored in a memory and running on a processor, the instructions configured to define a set of rules associated to objects 600. A set of rules may define how data (for example, properties within object 600) is treated at a compilation step by compiler 701 (as described previously). Encrypt/decrypt engine 704 comprises programming instructions stored in a memory and running on a processor, the instructions configured to function as a cryptographic system that uses pairs of keys: public keys which may be disseminated widely, and private keys which are known only to the owner. Encrypt/decrypt engine 704 may encrypt a plurality of fields of objects 600 before issuance to blockchain 500 so that the contents of objects are only visible by processes with the proper decryption process. Encrypt/decrypt engine 704 may further preforms decryption in a compilation or subscription step. Block processor 705 comprises programming instructions stored in a memory and running on a processor, the instructions configured to process various properties of objects 600 (referring to FIG. 6) including, but not limited to, reading and retrieving blocks 600 from blockchain 500. Report engine 716 comprises programming instructions stored in a memory and running on a processor, the instructions configured to process a plurality of compiled blocks, that is compilation objects 650 (as compiled by compiler 701) for use in report creation by, for example, as requested by subscriber device 714. In some embodiments, reports generated by report engine 716 may rely on report specific rules stored as report objects 644 (and associated to at least a portion of objects 600) in rules database 707 or in blockchain 500 (or both).

Configuration database 706 manages configuration for the block reconciliation system 700 and may be used by any system 700 component for component, system, and other configuration. Configurations may be created by user devices 713, company devices 712, entity devices 715, or any combination thereof. Rules database 707 stores rules from rules engine 703 available for configuring objects 600, or for compiling objects 600 by compiler 701. In some embodiments, rules database 707 is a local copy of the rules stored as rules objects 644 in blockchain 500 and may run independently of any connection to blockchain 500. In some embodiments, system 700 acts as a failover for configurations or rules stored in blockchain 500. Object database 708 may hold, at least, a primary configuration of objects 600 and made available in blockchain 500 such that they can be read for use and configuration from blockchain 500 and/or object database 708 by block processor 716 in block reconciliation system 700.

Subscriber interface 709 comprises programming instructions stored in a memory and running on a processor, the instructions configured to receive (and send) requests from a subscriber device 714 (for example, requests to view or download contents of compilation objects created by compiler 701, or for report creation by report engine 716, or the like). In some embodiments, subscriber interface 709 may be in the form of an API that may integrated into other software applications (for example, number management applications, financial management applications, and the like). The API may provide access to external programs to access compilation objects 650 (and other objects 600) via block processor 705 and manage all access rights and configurations to all API connected programs. Block processor 705 can access objects with proper access privileges and provide them to the API or other parts of system 700.

Device interface 710 comprises programming instructions stored in a memory and running on a processor, the instructions configured to manage communications with company devices 712, user devices 713, and entity devices 715. In some embodiments, user devices 713 may communicate information directly to blockchain 500, in other embodiments, devices may communicate with block reconciliation system 700 prior to object issuance by interaction recorder 702. Blockchain 500 is a public ledger of transactions that have been executed since the birth of block reconciliation system 700. In a preferred embodiment, it may constantly grow as "completed" blocks 540 (referring to FIG. 5) are added by interaction recorder 702 with a new set of object issuances. Objects 600 are added as blocks to blockchain 500 in a linear, chronological order (as described in FIG. 5). Company devices 712 are network connected device that comprises programming instructions stored in a memory and running on a processor, the instructions configured to communicate with device interface 710 to retrieve information from object database 708 or from blockchain 500 (or a combination of both, or from some other data source within system 700) to provide a mechanism for a company user review one or more objects 600 either individually or as compiled by compiler 701, or a combination of both.

Entity devices 715 are network-connected devices, each comprising programming instructions stored in a memory and running on a processor, the instructions configured to digitally describe associated services (for example, service available at a location or object to which the entity object 715 is associated) available to user devices 713. Entity devices 715 further comprise programming instructions configured to provide data (in the form of objects 600, and particularly including, but not limited to, interaction objects 620 and entity objects 630, or other objects 600, or any combination thereof) about usage of services associated to entity devices 715 used by user devices 713 (that is, interactions between a first user object 713 and a first entity object 715) to device interface 710 whereby interaction recorder 702 issues objects in the form of blocks to blockchain 500. In some embodiments, entity devices 715 comprise components of system 700 such that entity device 715 can issue objects 600 directly to blockchain 500. In similar embodiments, entity device 715 comprises an instance of system 700 such that it can act as a failover or it can perform actions in parallel to system 700. For example, company device 712 may be attached to a rental automobile whereby when a user device 712 utilizes the services of the automobile, interaction object 620 may be issued to blockchain 500 by interaction recorder 702 comprising information on details of the usage of the service are network-capable devices connected to restaurants comprising all available plates and associated costs, professional services with details around such services and associated costs, services or goods available for rental or purchase, and the like. It should be appreciated that according to a preferred embodiment of the invention, that entity devices 715 may be seen as an internetworking of physical devices, vehicles, buildings, and other items that are embedded with electronics, software, sensors, actuators, and network connectivity that enable these objects to collect and exchange data. Entity devices 715 may also referred to as "connected devices" and "smart devices". Entity devices 715 may be seen as an infrastructure of an information society between a plurality of entity devices 715 registered with system 700. In some embodiments, entity devices 715 allow physical objects to be sensed and/or controlled remotely across network infrastructure 310 creating opportunities for more direct integration of the physical world into systems 700, and resulting in improved efficiency, accuracy and data recordation for interactions between user devices 713, company devices 712, entity devices 715, or between any combination thereof. In some embodiments entity devices 715 may be augmented with sensors and actuators, to form a more general class of cyber-physical systems, which may also encompass technologies such as smart grids, smart homes, intelligent transportation and smart cities. Each entity device 715 is uniquely identifiable through via an associated entity object 630 and able to interoperate within network infrastructure 310 as described. It should be appreciated that according to a preferred embodiment of the invention, a user device 713 may automatically engage an entity device 715 when associated services are available or requested, or both. This communication may happen through a short-range wireless communication protocol, WiFi, or some other communication (for example, as disclosed in FIG. 1).

User device 713 may be a network-connected device that comprises programming instructions stored in a memory and running on a processor, the instructions configured to electronically request services associated to one or more entity devices 715 and generate interactions in the form of interaction objects 620 based on usage of services associated to entity object 715. In this regard, there may be one or more interaction objects 620 issued to blockchain 500 based on services used, and/or interactions between user devices 713 and entity objects 715.

Subscriber devices 714 each comprises programming instructions stored in a memory and running on a processor, the instructions configured to access and subscribe to objects (individual objects as issued by interaction recorder 702 or compiled objects as compiled by compiler 701) from blockchain 500 via subscriber interface 709. In some embodiments, a subscriber device 714 is an instance of reconciliation system 700 and can access objects directly from blockchain 500 through network 310. It should be appreciated that device interface 710 and subscriber interface 709 may manage access permissions for user devices 713, company devices 712, entity devices 715, and subscriber devices 714.

External data source 720 may be an additional data source for criteria selection for object compilation by compiler 701 or may be an additional source for rule definition. In some embodiments, external data source 720 may modify rules or add rule components in real-time during compilation or report creation.

Figure 8:
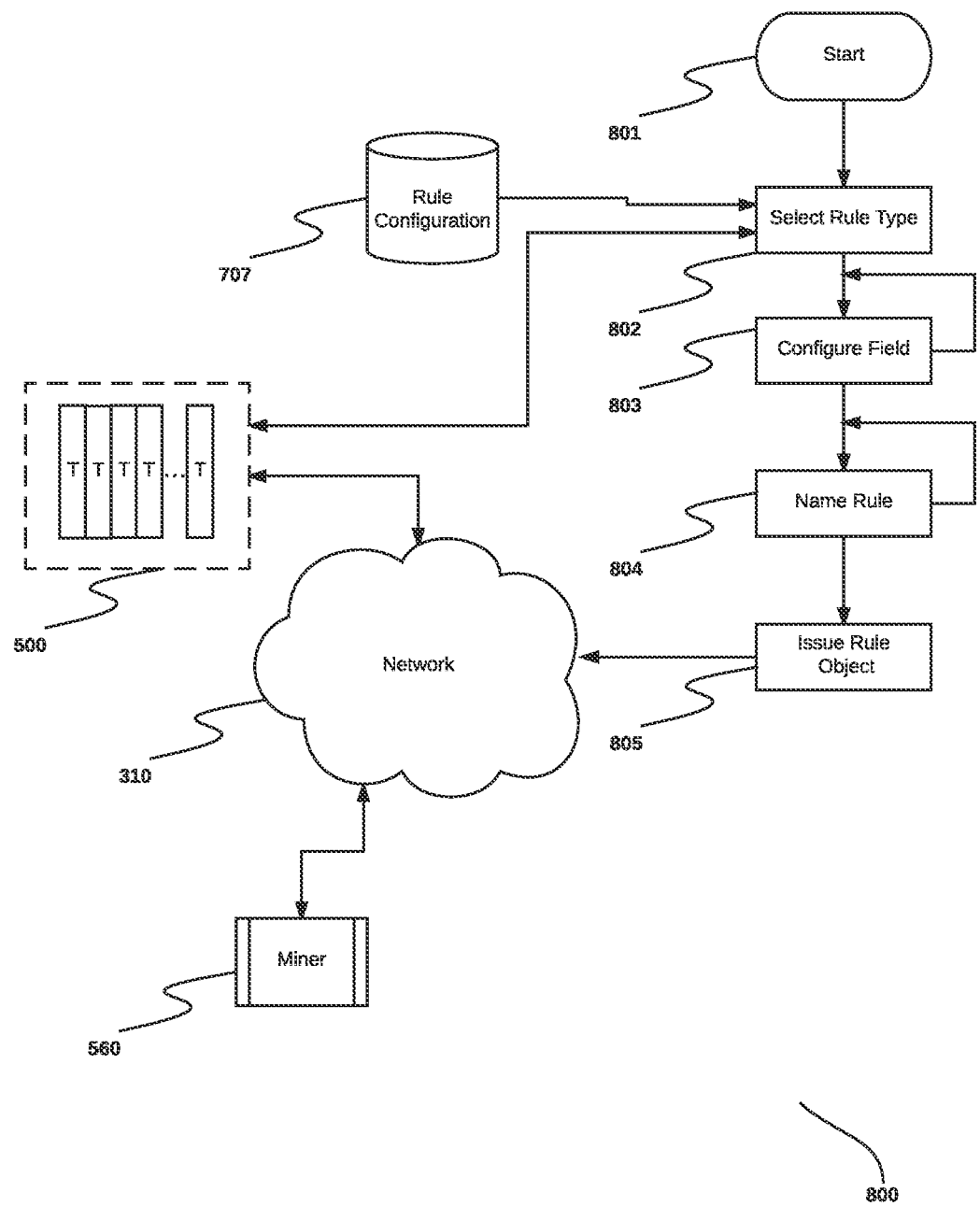
FIG. 8 is a flow diagram illustrating an exemplary method for issuing a rule to a block reconciled blockchain, according to a preferred embodiment of the invention.

FIG. 8 is a flow diagram illustrating an exemplary method for issuing a rule to a block reconciled blockchain, according to a preferred embodiment of the invention. According to the embodiment, a system for issuing a plurality of rules to blockchain 500 is disclosed. Rules may define, at least, how objects behave when objects 600 are issued to blockchain 500, how compilation objects 650 (or any object 600)

behaves when they are compiled by compiler 701, or how a report is generated by report engine 716, or other system behavior.

In a first step 801, a rule issuance function begins. In a next step, 802 a rule type is selected from a plurality of available pre-configured rule types as preconfigured (for example, by a company device 712) from blockchain 500, or in some embodiments, from rules database 707. In some embodiments rule database 707 is a copy of rules and rule types from blockchain 500. In some embodiments rule database 707 may act as a failover or redundancy process. In some embodiments, a plurality of sets of rule types may be available from a plurality of rule creators/rule publishers (for example, as provided through a plurality of company devices 712) to provide different behaviors affecting objects 600 or to provide compilation rules to compiler 701 based on, for example, external factors (for example, jurisdictional or legislative rules by region or provider, rules based on company policy, rules based on individual preference, and the like). In a next step 803, ruleProperties 649 are configured defining the rule and which blocks 600 may use the rule and how it may affect the data within the object or computations across multiple objects 600. In some embodiment, the instant rule may be used by compiler 701 or report engine 716. In some embodiments, rules are further defined by an external calculation program. In a next step 804, a name is assigned to the rule for convenience and easy identification. Further in step 804, rules engine 703 assigns a unique ID. In a next step 805, the instant rule is issued to blockchain 500 and made available for use by, at least, user devices 713, company devices 712, entity devices 715, compiler 701, report engine 716, or any other component of system 700 that provides a mechanism to affect the behavior of reporting (that is, functions performed on at least a portion of blocks/objects used in creating a report by, for example, subscriber device 714), behavior of compilation (that is, computations on a plurality of blocks/objects 600 compiled for a subscriber device 714, a company device 712, or for the creation of a compilation object 650), or behavior of issuance of blocks (that is, including, but not limited to, how properties may be manipulated before object issuance by interaction recorder 702), or any combination thereof. In a similar embodiment, all elements of the system, for example object configurations, would be created and stored in a similar fashion such that all elements for creating and instantiating, for example, objects 600 that would be available from blockchain 500 (or from an associated database from system 700).

Figure 9:
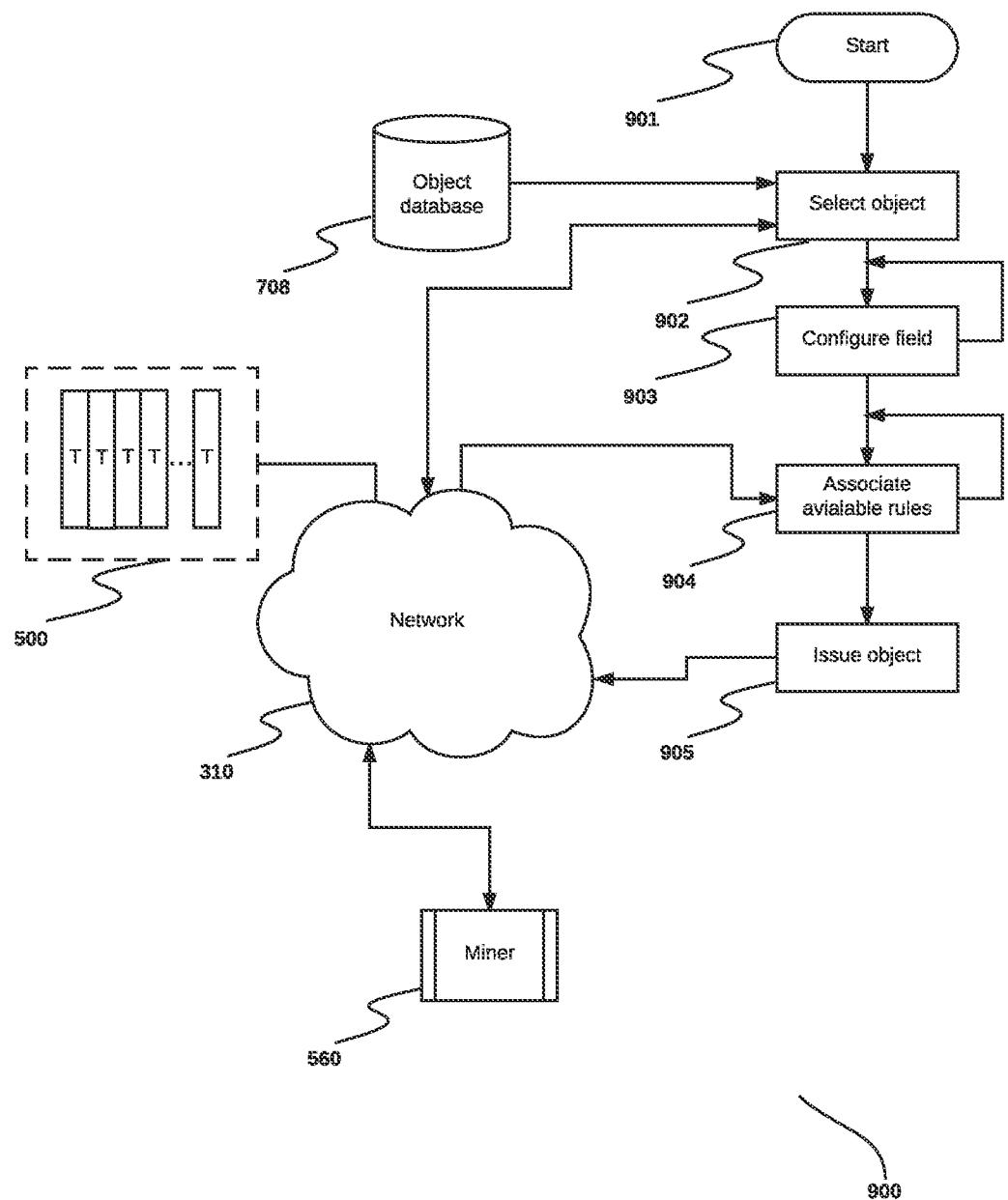
FIG. 9 is a flow diagram illustrating an exemplary method for issuing an object to a block reconciled blockchain, according to a preferred embodiment of the invention.

FIG. 9 is a flow diagram illustrating an exemplary method for issuing an object to a block reconciled blockchain, according to a preferred embodiment of the invention. According the embodiment, an issuance method comprises a configuration of plurality of objects 600 resulting from interactions between one or more company devices 712, user devices 713, subscriber devices 714, or entity devices 715, or any combination thereof, beginning in step 901.

In a next step 902, a device, for example user devices 713 may, for example, be requesting services from an entity device 715 whereby an interaction object 620 is used to journal the interaction between the devices to a public ledger blockchain 500. As such, an object configuration corresponding to an interaction object 620 is requested from blockchain 500 through network 310 (or in some embodiments, the object configuration is requested from object database 708). In a next step 903, fields 621 to 628 for interaction object 620 (as outlined in FIG. 6) are recursively populated until all required details are configured. In this example, interaction object 620 may include an interactionType 602 comprising of a contract/intention 603 whereby a supplemental object 650 is expected at some point in the future to, for example, outlining details of a fulfilment of contract 603. Once all fields 621 to 628 have been populated and configured, the process continues to a next step 904 whereby one or more rules are added based on pre-configuration (as defined in, for example, configuration database 706) or through user intervention (for example from a company device 712. Rules may ab assigned automatically by rules engine 703 based on object type 600, a specific user device 713, an associated company device 712, an entity device 715 (for example, an entityCategory 632 for entity device 715). Once the object configuration is complete and associated rules have been assigned, the object, for example, interaction object 620 discussed in this example) is issued by interaction recorder 702, in step 905 to blockchain 500 as block 540 to active block 501*n*. A similar process 900 applies for all blocks 600 that are added to the blockchain based on the device, interaction, and other factors.

Figure 10:
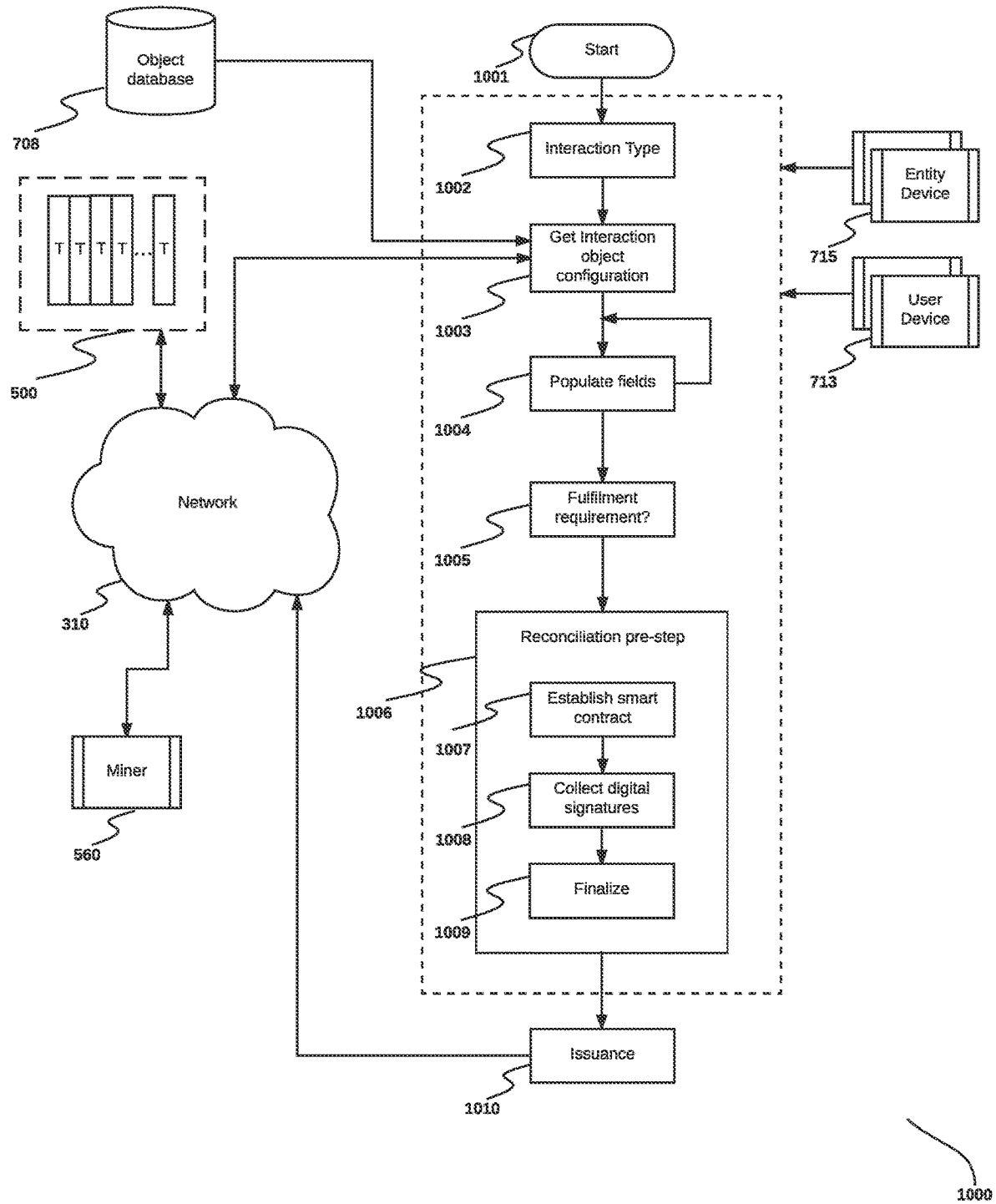
FIG. 10 is a flow diagram illustrating an exemplary method for issuing a plurality of interaction objects to a block reconciled blockchain, according to a preferred embodiment of the invention.

FIG. 10 is a flow diagram illustrating an exemplary method for issuing a plurality of interaction objects to a block reconciled blockchain, according to a preferred embodiment of the invention. According to the embodiment, a process for issuance of an interaction object 620 (referring to FIG. 6) starts at a first step 1001. In a next step 1002, an interaction type 602 is determined to a type for the interaction (for example, and interactionType 602 as described in FIG. 6). In a next step 1003, and interaction object 620 configuration is requested from blockchain 500 via network 310. In some embodiments, interaction object 620 configuration (for example, as configured in FIG. 9) is requested from a local object database 708. In some embodiments, object database 708 is a backup of blockchain 500 or a redundant copy for failover purposes, speed of access, or as a backup if network 310 becomes unavailable. In a next step 1004, interactionItems 628 are populated based on details from an associated interaction between an entity device 715 and a user device 713 or interaction between a plurality of user devices 713 on other devices. For example, a first user device 713 requests professional services associated to a second user device 713 that involves a contract and services exchanged for value. Accordingly, a digital signature for the first user device 713 is added to field 615 of interaction object 620 (It should be appreciated that all fields of blockchain object 610 are inherited by interaction object 620 and are thus present within interaction object 620, as described previously). A digital signature for the second user device 713 is recorded in other_party_digital_signature 625. Further according to the example, details surrounding an agreement between the first and second user device 713 are created and an interactionType contract/intention 603 is recorded to interactionType 626 of interaction object 620. Details describing the agreement (for example, cost, duration, start of service, end of service, etc.) are added to interaction items 628. In a next step, 1005, interactionType 626 of interaction object 620 is analyzed to determine if a fulfilment is required. That is, that compiler 701 or report engine 716 may be expecting an associated supplemental object 660 as further details for the interaction described in the instant interaction object 620. In some embodiment, some interaction object 620 configurations, a primary interaction object 620 is configured detailing an agreement between a user device 713 and another device, for example, an entity device 715, in this regard, there may be a plurality of interaction types interactionTypes 602 that would require a supplemental object 660, for example, an interactionType 602 (as configured by interactionType 626) configured as purchase 604 may require a supplemental object 660 to indicate that goods were indeed exchanged for value; an interactionType 626 configured as refund 605 may require a supplemental object 660 to indicate that a refund was actually issued; an interactionType 626 configured as expense 606 may require a supplemental object 660 to indicate that an associated expense was reimbursed; an interactionType 626 configured as fulfillment 607 may require a supplemental object 660 to indicate that some other condition expected for compilation by compiler 701 or report engine 716. It should be appreciated that for other object configurations, supplemental object 660 indicates that a previous interaction had a certain outcome. Once fields for interaction object 620 are configured, in a next step 1006, a reconciliation process commences to establish a smart contract, collect digital signatures of devices involved in the interaction, and data is recorded to the object to finalize the object to prepare for issuance as a block on blockchain 500 as follows: In a next step 1007, a smart contract is established to, at least, be used to automate transaction logic that may need to happen on blockchain 500. It should be appreciated that the smart contract step takes on several meanings from the smart contract code, whereby the code expresses the contract and technical features of blockchain 500. In some embodiments, smart contracts may be used to create a binding legal agreement, or an effective substitute for a binding legal agreement. With respect to smart contract code, blockchain 500 is capable to run code. While blockchains known in the art to primarily designed to perform a small set of simple operations—mainly, transactions of a currency-like token, techniques have been developed to allow blockchains to perform more complex programming operations, the instant invention is able to extend the capability to have fulfilment of agreements while enjoying the security of a blockchain system. Because smart contract code run on a blockchain, they have unique characteristics compared to other types of programming instructions. First, the programming instructions themselves may be recorded on blockchain 500, which gives blockchain 500 a characteristic permanence and censorship resistance. Second, the program instructions themselves may control blockchain assets. That is, transactions can be stored. Third, program instructions are executed by blockchain 500, meaning that it will always execute as written and no one can interfere with its operation. Accordingly, in a preferred embodiment, smart contract is used to refer to this blockchain code, for example, in an Ethereum arrangement whereby with the Ethereum project, the primary purpose is to be a platform for smart contract code. It should be appreciated however that in many embodiments, the term smart contract is used to refer to any complex programming instructions that are stored and executed on blockchain 500. Given that this programming code is governing something important and valuable, i.e. interactions between stakeholder devices (such as user devices 713, company devices 712, and entity devices 715), the smart contract code is a mechanism to enforce any terms associated to interactions recorded on blockchain 500. In some embodiments, the smart contract code may be a governance application that controls account permissions. In many embodiments, smart contract code is not used in isolation but as a small piece in a larger application (for example, an Ethereum arrangement may be primarily comprised of smart contract code). In a next step 1008, digital signatures are collected from one or more devices associated to interaction object 630 to ensures that items are only written to blockchain 500 if it comprises valid owners (that is, reconcile that the interaction object 620 and the block itself is valid and contains a valid transaction). It should be appreciated that valid owners may be determined by miners 560 (or in some embodiments peer nodes 550) based on the given digital signature and public key pair. In a next step 1009, the block is finalized comprising interaction object 620 and other data to make it ready for issuance. In a next step 1010, interaction object 620 is issued to blockchain 500 via network 310 by interaction recorder 702. It should be appreciated that with the proper digital signatures in place, blockchain miner 560 will be able to function as intended and see the issuance of the block as valid.

Figure 11:
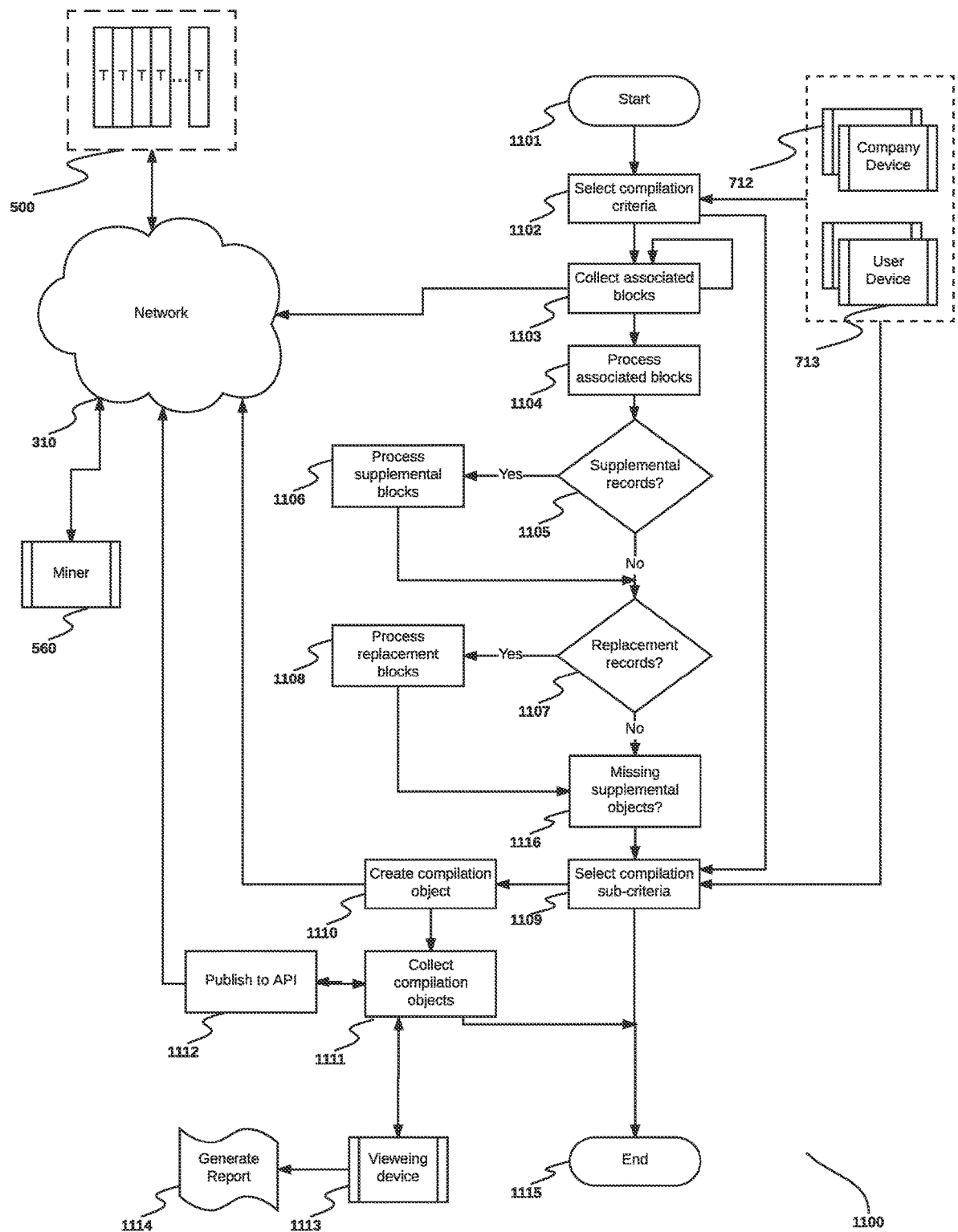
FIG. 11 is a flow diagram illustrating an exemplary method for compiling a plurality of interaction block to a block reconciled blockchain, according to a preferred embodiment of the invention.

FIG. 11 is a flow diagram illustrating an exemplary method for compiling a plurality of interaction blocks to a block reconciled blockchain, according to a preferred embodiment of the invention. According to the embodiment, a plurality of objects 600 are compiled by compiler 701 to create reports, calculate values, perform object reconciliation, and the like, starts in a first step 1101. In a next step 1102, compilation criteria may be received from a user device 713 (for example, a user device 713 belonging to an administrator), company device 712 (for example, a company device belonging to an individual wanting to compile an expense report associated to a user device 713 or an entity device 715), subscriber device 714, or entity device 715. Compilation criteria may define which objects are of interest to the requesting device for reconciliation, for example, at least a portion of interaction objects 620 based on a period-of-time, at least a portion of interaction objects 620 belonging to a particular user device 713 or a particular entity device 715, or at least a portion of interaction objects 620 involving interactions between two (or more) particular user devices 713. It should be appreciated that compilation criteria may involve any object 600 or selected and collected using any field of any previously issued objects 600.

In a next step 1103, compiler 701 uses the received criteria to identify at least a portion of objects previously issued as blocks to blockchain 500 associated to the criteria from step 1102. In a next step 1104 received blocks are processed (for example, are access through decryption based on access rights, if any). It should be appreciated that processing can include computation on fields and values stored in objects 600 (that is, objects 600 collected in step 1103), for example, date ranges may be calculated, percentages on values may be determined, values may be added or subtracted, or other computations based on, for example, the object type for collected objects 600, the interaction type for collected objects 600, or in combination with data or rules from external data source 720. It should also be appreciated that a plurality of preconfigured rules (previously stored as rules objects 644 and associated to the collected objects 600) may be performed in step 1104. For example, rules that define a category for processed information, or how particular computations should be carried out, or if some external data source 720 or external rules should be used in processing.

In a next step 1105 supplemental blocks 660 (if any) are collected from blockchain 500 based on the received criteria (from step 1102), if, for example, one or more interaction objects 620 identified that an associated supplemental object 660 should be collected. If so, in step 1106 compiler 701 processes the objects requiring supplemental information by modifying, adding, or replacing any previous associated collected objects 600 or by applying a computation to the plurality of values from collected objects 600, collected supplemental objects 660 or any combination thereof.

In a next step 1107, collected supplemental objects 660 may be categorized as replacement objects (if any). In this regard, collected replacement objects 660 are then processed to replace data, in step 1108, for previous issued objects 600.

In a next step 1116, compiler 701 determines if a previously issued collected object 600 is expecting an associated supplemental object 660 but none were present on blockchain 500. In this case, compiler 701 (or in some embodiments, reporting engine 716) may analyze date specific properties within interactionItems 628 or based on a calculation using date-time 613 (or a combination of both) of, for example, where object 600 is an interaction object 620, to determine if an associated supplemental object 660 should have already been issued to blockchain 500 or if one is expected at some future point. In the case where a supplemental object 660 should exist and there is not one present, compiler 701 may flag the parent interaction object (that is, the interaction object 620 that has no supplemental object 660 that was expected). In some embodiments, where a supplemental object 660 is expected and a report is being created by report engine 716, proper reporting considerations may be put in place to identify the missing supplemental object 660. For example, for an interaction object 620 where an interactionType 626 is configured as refund 605, and no expected supplemental object 660 exists, it may indicate that the refund may not have been received or refund process was not completed (or in some configurations, based on, for example, calculations, a refund may still be pending). In this example, and in the case where a compilation is being performed by compiler 701, interaction 620 will be flagged as not executed, and in the case of reporting by report engine 716, a resulting report may reflect that no refund was given for an interaction represented by interaction object 620.

In a next step 1109, there may be sub-criteria to take into consideration by compiler 701, for example, as received from company device 712 or user device 713. For example, criteria indicating a creation of one or more compilation objects 650 comprising aggregated information from the collected objects 600. For example, a compilation object 650 may have pre-calculated values present, may have supplemental values replaced (for example, as performed in step 1108). Compilation sub-criteria that may be received in step 1109 may optionally, as described, produce a compilation object 650 with compiled information. If a compilation object 650 is created, it may be written to blockchain 500 by interaction recorder 702.

In some embodiments compiled blocks collected, in step 1111, are made available through an application programming interface (API) for embedding into other software (and hardware) packages in step 1112. In some embodiments, the API also receives any compiled objects previously created and issued to blockchain 500.

In some embodiments, in step 1113, a viewing device (for example, company device 712, user device 713, subscriber device 714, or entity device 715) may view compiled information as compiled in process 1100 and may optionally create reports in step 1114.

Detailed Description of Exemplary Embodiments

According to a preferred embodiment of the invention, exemplary programming instructions to perform at least a portion of the functions described previously are as follows. The accompanying programming instructions are meant as a notation resembling simplified programming instruction and meant to illustrate several embodiments of the invention and, together with the description, serve to explain the principles of the invention according to the embodiments. It will be appreciated by one skilled in the art that the particular programming instructions are only a subset to highlight specific functions and are merely exemplary and are not to be considered as limiting of the scope of the invention or the claims herein in any way.

In a preferred embodiment of the invention, exemplary programming instructions for inserting objects 600 to blockchain 500 may be:

Function insert(BlockchainObject newObject)

submits an object 600 to blockchain miners 560 for verification if accepted, will eventually be written into the next Block as block 540.

This function may ensure that items are written to the Blockchain if they are submitted by valid owners as described previously. Valid owners are determined by miners 560 (or ins some embodiments by peer nodes 550) based on associated digital signatures and public key pair.

In a preferred embodiment of the invention, exemplary programming instructions for retrieving relevant objects 600 based on objectId 611 which may return more than one objects 600 including any amendments (that is, considering supplemental objects 660 or supplemental objects 660 designated as replacement objects), are as follows:

```
Function retriveObject(String id){
    Array<BlockchainObject> return_value = [ ]
    anObject =
    theBlockchain.getFinalizedBlocks( ).search(objectId == id)
    returnValue.add(anObject)
    ammendedObjects =
theBlockchain.getFinalizedBlocks( ).search(BlockchainObject.type
==
    Supplemental &&         ammendedObjectId ==
anObject.objectId)
        returnValue.add(ammendedObjects)
return return_value
    }
```

In a preferred embodiment of the invention, exemplary programming instructions for retrieving relevant interaction objects 620 based on, for example, a company and a date range, for example, to retrieve a set of items for a compilation step by compiler 701, based on the properties: date range and company. In some embodiments, a similar search based on interaction_event & user device 713 (such as, interaction objects 620 associated to, for example, "European business trip for John Doe") may be performed, are as follows:

```
Function retriveObject(String company_name, DateTime start_date,
DateTime end_date){
    Array<BlockchainObject> return_value = [ ]
    someObjects =
theBlockchain.getFinalizedBlocks( ).search(BlockchainObject.type ==
Interaction
&&
    company == company_name &&
    start_date <= date_time <= end_date)
```

```
        returnValue.add(someObjects)
        for each (BlockchainObject b in someObjects) {
            ammendedObjects =
theBlockchain.getFinalizedBlocks( ).search(BlockchainObject.type ==
Supplemental && ammendedObjectId == anObject.objectId)
            returnValue.add(ammendedObjects)
        }
        return return_value
}
```

In a preferred embodiment of the invention, exemplary programming instructions to retrieve associated rules for a given interaction object 620, are as follows:

```
Function retrieveObject(String a_interaction_type,
String a_company_type, String
an_entity_type, DateTime start_date, DateTime end_date){
        Array<BlockchainObject> return_value = [ ]
        ruleObject =
        theBlockchain.getFinalizedBlocks( ).search(BlockchainObject.type
== Rules && type == a_interaction_type &&
        companyType == a_company_type &&
        entityCategory == an_entity_type &&
        start_date <= date_time <= end_date)
        returnValue.add(ruleObject)
        ammendedObjects =
theBlockchain.getFinalizedBlocks( ).search(BlockchainObject.type ==
Supplemental && ammendedObjectId == anObject.objectId)
        returnValue.add(ammendedObjects)
        return return_value
}
```

In a preferred embodiment of the invention, exemplary programming instructions for generating a new interaction object 620 to be submitted to the blockchain 500 by interaction recorder 702, may be as follows:

```
Function newInteraction(User consumer, User device_or_company,
String an_interaction_id, String signature , String event_name,
InteractionType t,
Array<BlockchainObject> objects, Bool encrypt?){
        interactionObject = new Interaction (consumer = consumer.name,
        company = device_or_company.name,
            interaction_id = an_interaction_id,
            other_party_digital_signature = signature,
            interaction_event = event_name
        type = t,
        interactionItems = objects)
            if (encrypt?) {
                InteractionObject =
                encryptBlockchainObject(interactionObject,
            consumer.privateBlockchainKey,
            company.privateBlockchainKey) }
        this.insert(InteractionObject)
}
```

In a preferred embodiment of the invention, exemplary programming instructions for compilation of objects by compiler 701 based on received criteria (for example, as in step 1102 referring to FIG. 11) may takes at least a portion of associated interaction objects 620 for a given company device 712; compiler 701 may then compile at least a portion of associated rule objects 644 and at least a portion of associated supplemental objects 660 (i.e. process any required amendments or replacements) and may be used to calculate a report by report engine 716 (for example, a tax or an expense report). In some embodiments, compilation objects 650 may be added into blockchain 500 for access by, for example, subscriber devices 714 (or other devices). For example, a subscriber device 714 may be a company compiling an expense report for user device 713 for a specific business trip given a specific start date and end date. The exemplary programming instructions are as follows:

```
Function compileReportObjects(String company, DateTime start_date,
DateTime end_date){
        Array<BlockchainObject interaction, BlockchainObject rules)>
        return_value
= [ ]
        interactions = retriveObject(company, start_date, end_date)
        interactions = decrypt(interactions) //if the items are
        encrypted, then they
have to be decrypted.
        for each (BlockchainObject t in interactions) {
        //look up the relevant rules and amendments, and link it
        to each interaction
        rules = retrieveObject(t.type, t.company.company_type,
        t.entity.entity_type,
start_date, end_date)
        returnValue.add(t, Rules)
        }
        return_value = reconcile(return_value) // perform the reconciliation step
compilationObject = createCompilationObject(return_value, subscribers)
//Create a CompilationObject and record which subscribers are
allowed to access the rerport
        this.insert(compilationObject) //Insert the compilation into the
        Blockchain
        return compilationObject
}
```

In some embodiments, with respect to the retrieveObject function (as above) may be based on interaction_event 627. In some embodiments, a reconciliation result may be issued into the blockchain 500. Further, a definition of an additional blockchain object 610 type may be performed, and instead of returning return_value, the instructions may instead make a call to the method: insert(BlockchainObject) as described above.

In a preferred embodiment of the invention, exemplary programming instructions may encrypt any objects 600 (for example, blockchain object 610): using multi-party encryption so that only certain devices involved may read the contents of encrypted objects 600:

```
Function encryptBlockchainObject(BlockchainObject b, String
private_key_consumer, String private_key_device_or_company){
        BlockchainObject return_value = [ ]
        return_value = applyMultiPartyEncryption(b,
private_key_consumer, private_key_device_or_company)
        return return_value
}
```

In some embodiments, the above function applyMultiPartyEncryption may use multi-party encryption methods such as SHA-256 (or others), so that at least one of either of two private keys associated to the blockchain object 610 will be necessary in order to read the contents of the blockchain object 610. In some embodiments, public keys, blockchain_id, date range of the block, and digital signatures may not be encrypted. It should be appreciated that in different embodiments, different fields, blocks, or objects may be encrypted while others are not based on the specific requirements of the implementation or sensitivity of data within objects 600.

In a preferred embodiment of the invention, exemplary programming instructions to decrypt BlockchainObject may takes any object 600 to decrypt it if the provided privateKey is valid, may be as follows:

```
Function decryptBlockchainObject(BlockchainObject b,
String public_key, String private_key){
BlockchainObject return_value = [ ]
    return_value = decryptBlock(b, public_key, private_key)
    return return_value
}
```

In some embodiments, the above function decryptBlock may use encryption methods such as SHA-256 (or others) so that if the provided private key satisfies the specified public key, the contents of the BlockchainObject may be decrypted.

In a preferred embodiment of the invention, exemplary programming instructions to take a set of interaction objects 620 for a given compilation to perform a reconciliation, may be as follows:

```
Function reconciliation(Array<BlockchainObject> objects){
    For each, for example, for example, interaction object 620
    with interactionType 603 (i.e. contract), ensure that there is a
    matching object that contains the same interaction_id, thus ensuring
    that both parties agreed to the Contract/Intention. If not, flag these
    interactions as incomplete.
    Next, for each valid, for example, interaction object 620 with
    interactionType 603 (i.e. contract) identified in the previous
    step, check to see if the associated fulfillment object is present:
        If present and fulfilled amicably, the apply appropriate,
        for example, credit/expenses
        If present and fulfilled non-amicably (for example,
        one party did not pay, or the other part did not complete the
        work, i.e. no supplemental object 660 issued), calculations may
        result to apply appropriate losses
        If not present, then flag as unresolved (in which
        case a fulfillment could be submitted or could be considered a
        loss)
    return results
}
```

It should be appreciated that object type in the above function may be any interactionType 602 (for example refund 605) that may require reconciliation.

The skilled person will be aware of a range of possible modifications of the various embodiments described above. Accordingly, the present invention is defined by the claims and their equivalents.

What is claimed is:

1. A system for block management, the system comprising:
    a network-connected block management computer comprising a memory and a processor and further comprising programmable instructions stored in the memory and operating on the processor, the programmable instructions, when executed by the processor cause the processor to:
    establish a connection to one or more blockchains;
    receive a plurality of supplemental blocks from the one or more blockchains, wherein at least a portion of the plurality of supplemental blocks corresponding to a preconfigured interaction object;
    receive one or more preconfigured rules from the one or more blockchains; and
    create one or more compilation objects based on the one or more preconfigured rules, each compilation object comprising the preconfigured interaction object and the at least portion supplemental objects;
    wherein the one or more compilation objects are stored on the one or more blockchains.

2. The system of claim 1, wherein the programmable instructions, when further executed by the processor cause the processor to:
    create a report based on at least a portion of the one or more compilation objects.

3. The system of claim 1, wherein the programmable instructions, when further executed by the processor cause the processor to:
    receive a connection from an external data source;
    receive additional preconfigured rules, from the external data source, to supplement the one or more preconfigured rules.

4. The system of claim 1, wherein the programmable instructions, when further executed by the processor cause the processor to:
    provide access, via an application programming interface, to the one or more compilation objects to at least a portion of the plurality of connected devices.

5. A computer-implemented method for block management, the method comprising:
    receiving, at a compiler, a plurality of blocks from the one or more blockchains;
    requesting, at the compiler, a plurality of supplemental blocks from the one or more blockchains, wherein at least a portion of the plurality of supplemental block correspond to an associated interaction object;
    receiving, at the compiler, one or more preconfigured rules from the one or more blockchain;
    creating, at the compiler, one or more compilation objects, each compilation object comprising the preconfigured interaction objects and the at least portion of the plurality of supplemental objects;
    storing, by the compiler, the one or more compilation objects on the one or more blockchains.

6. The method of claim 5, further comprising the step of:
    creating, at a report engine, a report based on at least a portion of the one or more compilation objects.

7. The method of claim 5, further comprising the step of:
    receiving, at the compiler, additional preconfigured rules, from an external data source, to supplement the one or more preconfigured rules.

8. The method of claim 5, further comprising the step of:
    providing access, via an application programming interface, to the one or more compilation objects.

9. The method of claim 5, wherein each of the one or more compilation objects comprises at least one interaction object, and wherein each interaction object corresponds to one of a user object, a company object, and a device object that are involved in an interaction associated with the interaction object.

10. The method of claim 9, further comprising the steps of:
    receiving, at the compiler, a plurality of criteria from a first connected device; and
    analyzing, at the compiler, each interaction object to determine if the interaction object has an associated required supplemental object, an association based on the plurality of criteria.

11. The system of claim 1, wherein each of the one or more compilation objects comprises at least one interaction object, and wherein each interaction object corresponds to one of a user object, a company object, and a device object that are involved in an interaction associated with the interaction object.

12. The system of claim 11, wherein the programmable instructions, when further executed by the processor cause, the processor to:
  receive a plurality of criteria from a first connected device; and
  analyze each interaction object to determine if the interaction object has an associated required supplemental object, an association based on the plurality of criteria.

* * * * *